(12) United States Patent
Smyers

(10) Patent No.: US 8,678,230 B2
(45) Date of Patent: Mar. 25, 2014

(54) VESSELS WITH AIR-TIGHT LID SYSTEMS

(75) Inventor: Justin Smyers, Newport Beach, CA (US)

(73) Assignee: Snapware Corporation, Mira Loma, CA (US)

( * ) Notice: Subject to any disclaimer, the term of this patent is extended or adjusted under 35 U.S.C. 154(b) by 276 days.

(21) Appl. No.: 13/193,456

(22) Filed: Jul. 28, 2011

(65) Prior Publication Data

US 2012/0024855 A1 Feb. 2, 2012

Related U.S. Application Data

(60) Provisional application No. 61/449,563, filed on Mar. 4, 2011, provisional application No. 61/369,644, filed on Jul. 30, 2010.

(51) Int. Cl.
*B65D 41/16* (2006.01)

(52) U.S. Cl.
USPC .......... 220/784; 220/324; 220/326; 220/788; 206/457

(58) Field of Classification Search
USPC ................. 220/324, 326, 784, 788; 206/457
See application file for complete search history.

(56) References Cited

U.S. PATENT DOCUMENTS

| | | |
|---|---|---|
| 1,542,115 A | 6/1925 | Weiss |
| 2,928,567 A | 12/1957 | Davis |
| 3,117,692 A | 1/1964 | Carpenter et al. |
| 3,409,123 A | 11/1968 | McCormick |
| 3,797,694 A | 3/1974 | See et al. |
| 3,800,972 A | 4/1974 | Raymond |
| 3,817,419 A | 6/1974 | Moller et al. |
| 3,861,433 A | 1/1975 | Schier et al. |
| 4,206,845 A | 6/1980 | Christian |
| 4,482,077 A | 11/1984 | Henderson |
| 4,494,674 A | 1/1985 | Roof |
| 4,501,378 A | 2/1985 | Berfield |
| 4,512,498 A | 4/1985 | Leibinger |
| 4,562,047 A | 12/1985 | Sestak et al. |

(Continued)

FOREIGN PATENT DOCUMENTS

| | | |
|---|---|---|
| CA | 2314537 | 1/2002 |
| DE | 20320088 | 6/2005 |

(Continued)

OTHER PUBLICATIONS

Written Opinion of the International Searching Authority, PCT/US2011/046014, mailed Sep. 8, 2011.

(Continued)

*Primary Examiner* — Anthony Stashick
*Assistant Examiner* — Elizabeth Volz
(74) *Attorney, Agent, or Firm* — Larry K. Roberts

(57) ABSTRACT

An exemplary embodiment of a vessel-lid combination includes a glass, ceramic or metal vessel having an open top surrounded by a peripheral edge, a lid fabricated of a plastic material, and a seal structure integrated with the lid to form a unitary structure. The lid is configured to attach to the open top by means of a latch or set of latches integrated with the lid, and the seal structure is configured to provide an air-tight seal between the lid and the peripheral edge of the vessel when the lid is attached to the vessel. In one exemplary embodiment, the vessel is a container fabricated of a glass suitable for baking or oven heating applications.

31 Claims, 29 Drawing Sheets

(56) References Cited

U.S. PATENT DOCUMENTS

| | | |
|---|---|---|
| 4,702,389 A | 10/1987 | Bozinovich et al. |
| 4,703,857 A | 11/1987 | Jahnen et al. |
| 4,795,056 A | 1/1989 | Meyers |
| 4,936,483 A | 6/1990 | Ballu |
| 4,951,832 A | 8/1990 | Tenney et al. |
| 4,971,774 A | 11/1990 | Schwanke et al. |
| 5,016,756 A | 5/1991 | Wischhusen et al. |
| 5,115,934 A | 5/1992 | Nelson |
| 5,116,240 A | 5/1992 | Wischhusen et al. |
| 5,184,745 A | 2/1993 | Havens et al. |
| 5,356,026 A | 10/1994 | Andress et al. |
| 5,409,128 A | 4/1995 | Mitchell |
| 5,586,656 A | 12/1996 | Abrums |
| 5,641,065 A | 6/1997 | Owens et al. |
| 5,692,617 A | 12/1997 | Adams |
| 5,699,925 A | 12/1997 | Petruzzi |
| 5,769,229 A | 6/1998 | Andress et al. |
| 5,799,792 A | 9/1998 | Abrums |
| 5,944,211 A | 8/1999 | Woodnorth et al. |
| 6,129,234 A | 10/2000 | Culig et al. |
| 6,170,691 B1 | 1/2001 | Morris, Sr. et al. |
| 6,343,708 B1 | 2/2002 | Riso |
| 6,648,168 B2 * | 11/2003 | Fujii et al. ................ 220/592.21 |
| 6,729,472 B2 | 5/2004 | Stucke et al. |
| D493,335 S | 7/2004 | Armato |
| 6,793,096 B1 | 9/2004 | Seok |
| 6,796,430 B2 | 9/2004 | Mercier et al. |
| D499,931 S | 12/2004 | Kim |
| D500,227 S | 12/2004 | Seok |
| D501,764 S | 2/2005 | Lerner |
| D503,872 S | 4/2005 | Armato |
| D516,376 S | 3/2006 | Kim |
| 7,090,089 B2 | 8/2006 | Lown et al. |
| 7,097,066 B2 | 8/2006 | Tucker et al. |
| 7,097,067 B2 | 8/2006 | Scarabelli et al. |
| D528,357 S | 9/2006 | Hsu |
| D536,571 S | 2/2007 | Kim |
| D549,519 S | 8/2007 | Moon et al. |
| 7,261,219 B2 | 8/2007 | Tucker et al. |
| D556,517 S | 12/2007 | Lown et al. |
| D562,083 S | 2/2008 | Lown et al. |
| D580,218 S | 11/2008 | Kim |
| 7,510,096 B2 | 3/2009 | Wang |
| D590,666 S | 4/2009 | Wang |
| D591,112 S | 4/2009 | Wang |
| 7,594,586 B2 | 9/2009 | Cai |
| D601,384 S | 10/2009 | Shah |
| D604,119 S | 11/2009 | Kim |
| 7,621,417 B2 | 11/2009 | Peterson et al. |
| 7,726,483 B2 | 6/2010 | Ramanujam et al. |
| 2002/0104846 A1 | 8/2002 | Rosenfeld |
| 2003/0019878 A1 | 1/2003 | Scarabelli et al. |
| 2003/0116572 A1 | 6/2003 | Klock et al. |
| 2004/0155048 A1 * | 8/2004 | R. Aiken ........................ 220/801 |
| 2005/0006390 A1 | 1/2005 | Wang |
| 2005/0045628 A1 | 3/2005 | Chan |
| 2005/0139604 A1 | 6/2005 | Kim |
| 2006/0027588 A1 | 2/2006 | Mackovic-Basic et al. |
| 2006/0070907 A1 | 4/2006 | O'Shea |
| 2006/0207993 A1 | 9/2006 | Copeland |
| 2006/0261065 A1 | 11/2006 | Claypool et al. |
| 2007/0119743 A1 | 5/2007 | Tucker et al. |
| 2007/0170190 A1 | 7/2007 | Milesi et al. |
| 2007/0187277 A1 | 8/2007 | Furlong |
| 2007/0284276 A1 | 12/2007 | Luttik et al. |
| 2008/0000795 A1 | 1/2008 | Deakin et al. |
| 2008/0105684 A1 | 5/2008 | Lindsay |
| 2008/0110911 A1 | 5/2008 | Chen |
| 2009/0000977 A1 | 1/2009 | Coonce |
| 2009/0008284 A1 | 1/2009 | Lown et al. |
| 2009/0026205 A1 | 1/2009 | Moon |
| 2009/0057318 A1 | 3/2009 | Aseff |
| 2009/0078715 A1 | 3/2009 | Kim |
| 2009/0084796 A1 | 4/2009 | Coonce et al. |
| 2009/0166369 A1 | 7/2009 | Savicki |
| 2009/0173656 A1 | 7/2009 | Furlong |
| 2009/0206080 A1 | 8/2009 | Ribi |
| 2009/0218360 A1 * | 9/2009 | Suk ................................ 220/784 |
| 2009/0223986 A1 | 9/2009 | Song |
| 2010/0065461 A1 | 3/2010 | Chhay |
| 2010/0170204 A1 | 7/2010 | Altheimer |
| 2010/0170824 A1 | 7/2010 | Ramanujam |
| 2010/0176022 A1 | 7/2010 | Furlong |
| 2010/0200588 A1 | 8/2010 | Bergman et al. |
| 2010/0237070 A1 | 9/2010 | Coonce et al. |
| 2011/0163099 A1 | 7/2011 | DiPietro et al. |

FOREIGN PATENT DOCUMENTS

| | | | |
|---|---|---|---|
| DE | 202010007217 | 9/2010 | |
| EP | 1550617 | 6/2005 | |
| EP | 1550617 * | 7/2005 | ............ B65D 45/20 |
| WO | 2007064833 | 6/2007 | |

OTHER PUBLICATIONS

International Search Report, PCT/US2011/04601, mailed Sep. 8, 2011.

* cited by examiner

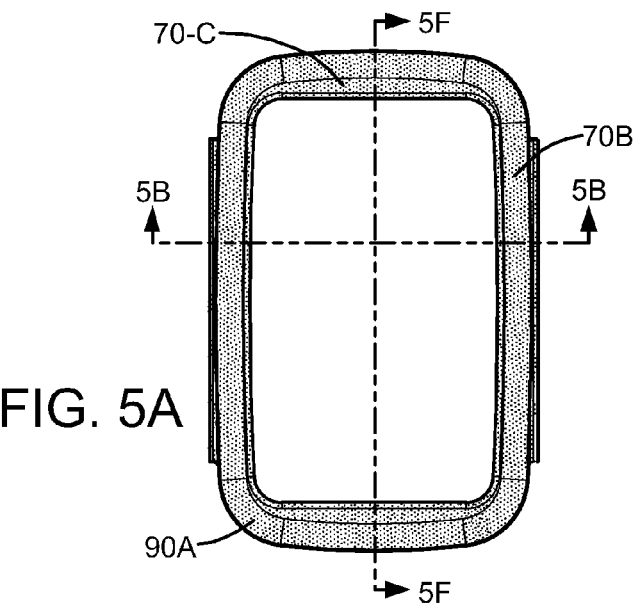
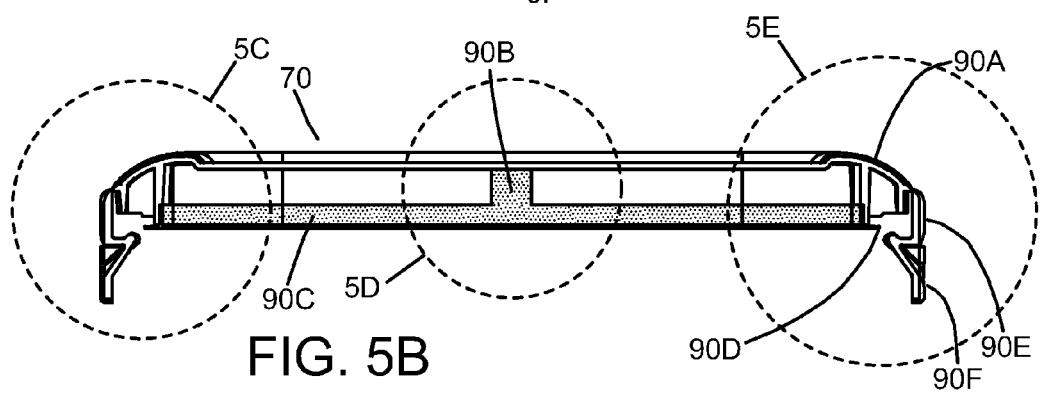
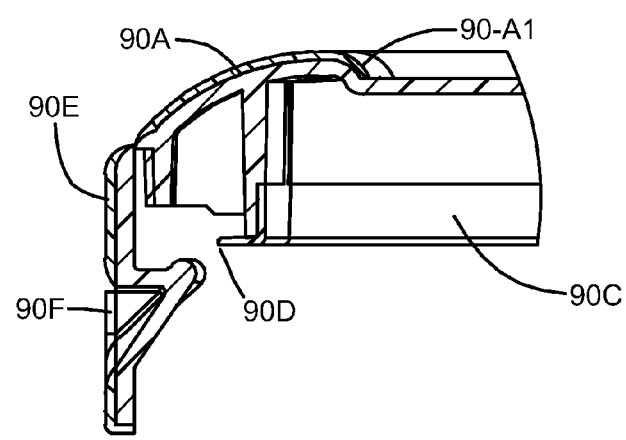
FIG. 5A
FIG. 5B
FIG. 5C

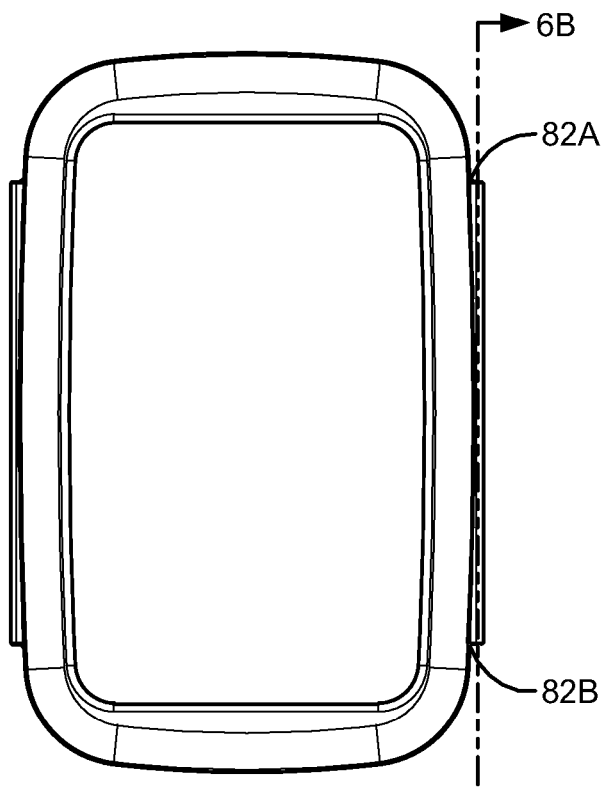
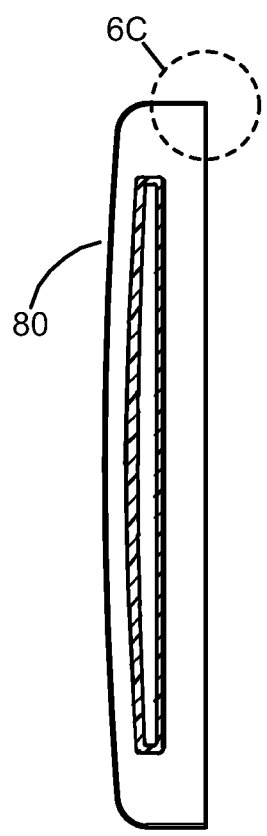
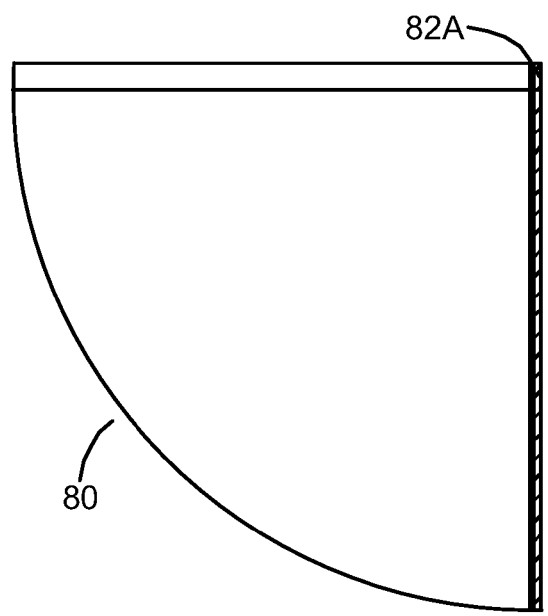
FIG. 6A
FIG. 6B
FIG. 6C

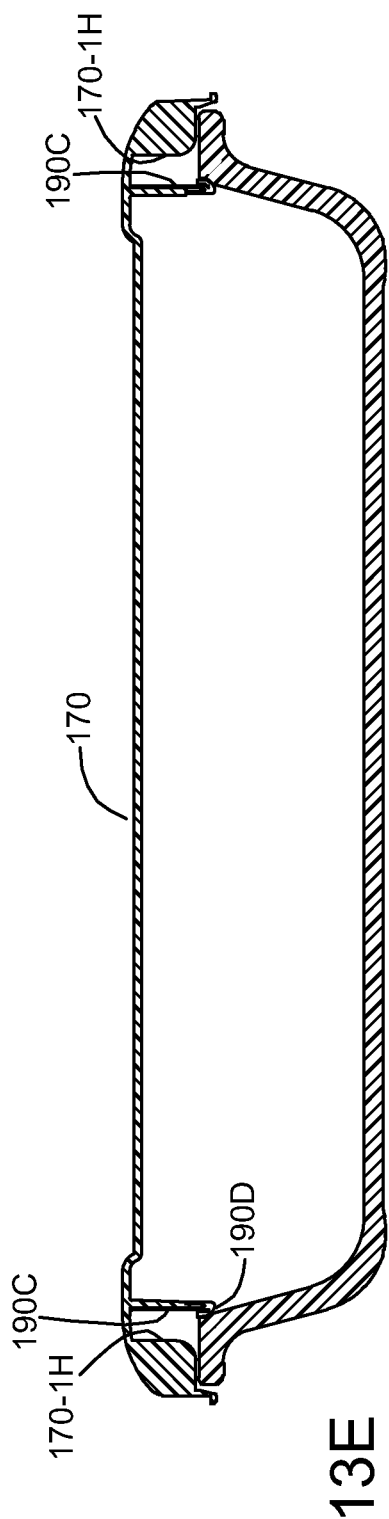
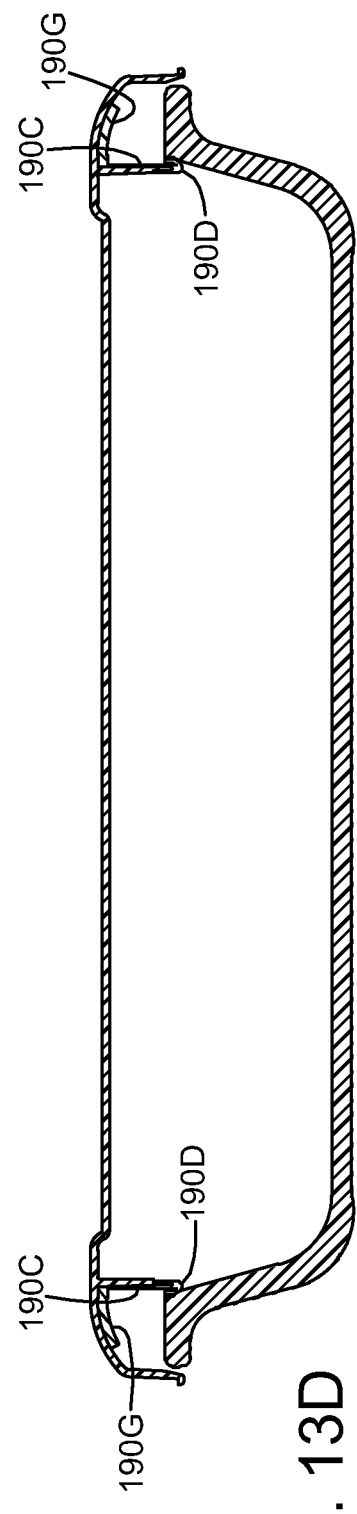
FIG. 13E
FIG. 13D

VESSELS WITH AIR-TIGHT LID SYSTEMS

CROSS-REFERENCE TO RELATED APPLICATIONS

This application claims priority from provisional U.S. Application No. 61/449,563, filed Mar. 4, 2011, and from provisional U.S. Application 61/369,644, filed Jul. 30, 2010, the entire contents of which applications are hereby incorporated by reference.

BACKGROUND

Vessels for holding food items may include a separate lid, but are often not provided with an air-tight seal. This is particularly the case for glass bakeware vessels for example. Air-tight containers-lid systems are typically fabricated from a rigid plastic material, and typically utilize a separate seal member disposed between the lid and container.

BRIEF DESCRIPTION OF THE DRAWINGS

Features and advantages of the disclosure will readily be appreciated by persons skilled in the art from the following detailed description when read in conjunction with the drawing wherein:

FIG. 5A is a top view of an embodiment of the lid of FIG. 1A. FIG. 5B is a cross-sectional illustration of the lid of FIG. 5A, taken along line 5B-5B of FIG. 5A. FIG. 5C is an enlarged portion of FIG. 5B, within circle 5C of FIG. 5B.

FIG. 6A is another top view of the lid of FIG. 1A. FIG. 6B is a cutaway view, taken along line 6B-6B of FIG. 6A. FIG. 6C is an enlarged view of the portion of FIG. 6B within circuit 6C.

FIGS. 13B, 13C, 13D, 13E and 13F are respective cross-sections taken along cross-sectional lines indicated in FIG. 13A.

DETAILED DESCRIPTION

Figure 1A:
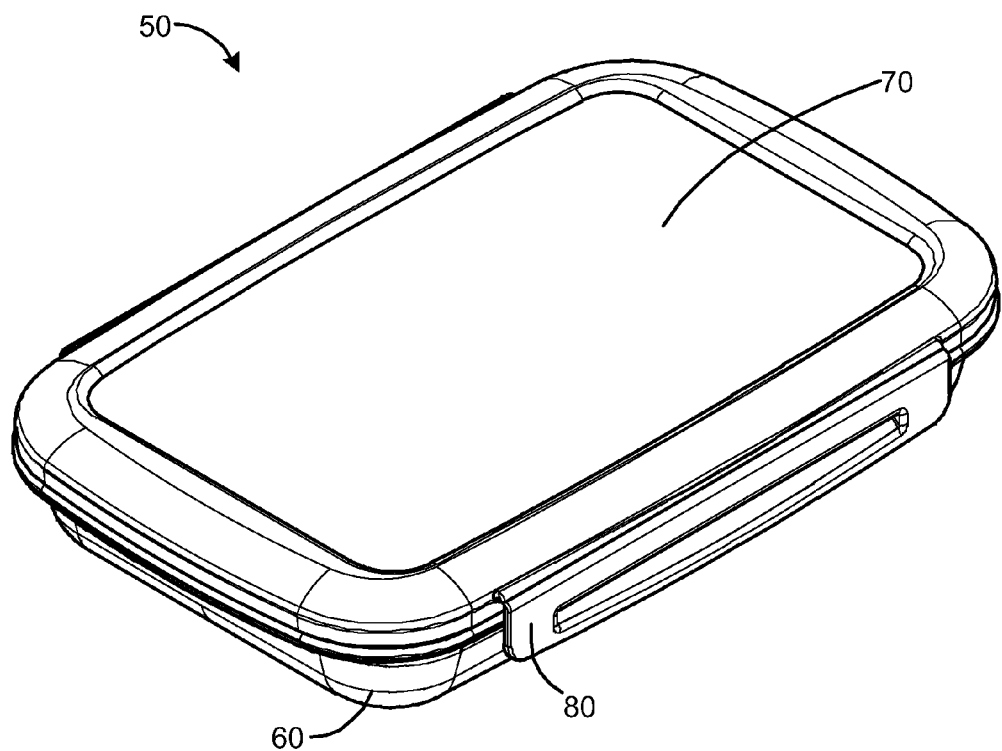
FIG. 1A is an isometric view of an exemplary embodiment of a vessel and lid in an attached configuration to provide an air-tight seal.
Figure 1B:
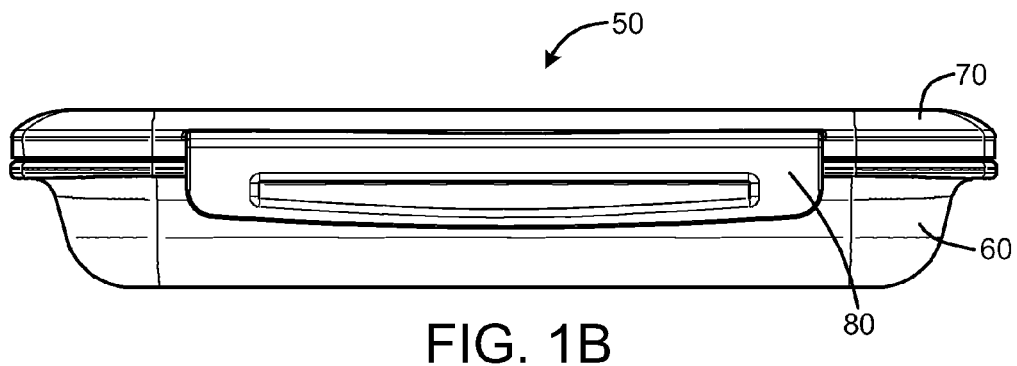
FIG. 1B is a side view of the vessel-lid combination of FIG. 1A.
Figure 1C:
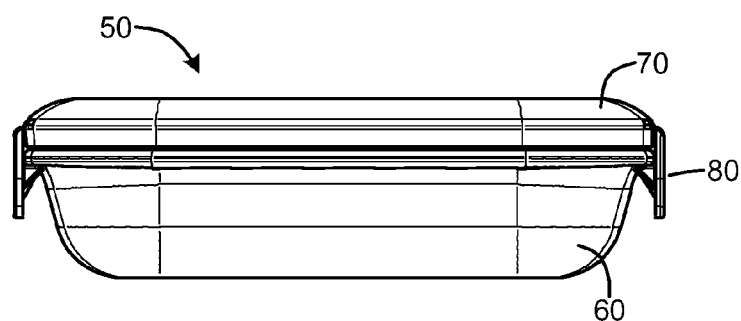
FIG. 1C is a front view of the vessel-lid combination of FIG. 1A.
Figure 1D:
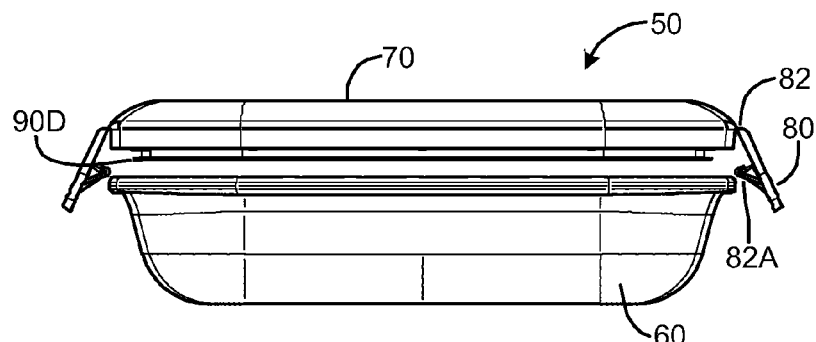
FIG. 1D is an exploded view of the vessel and lid.
Figure 2A:
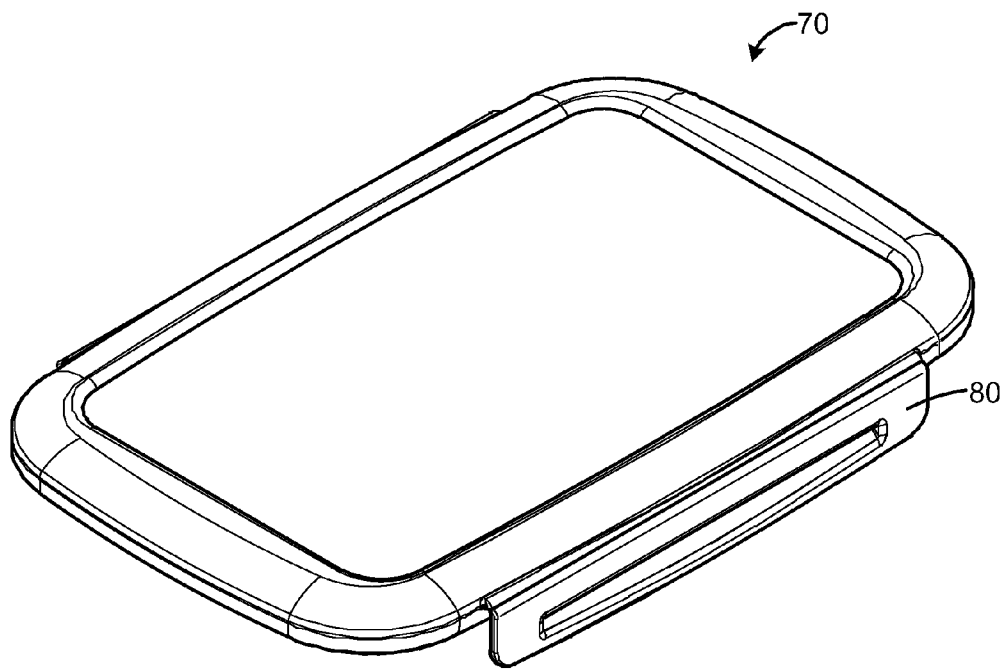
FIG. 2A is an isometric view of the exemplary lid of the combination of FIG. 1A, with the latches in a latch position.
Figure 2B:
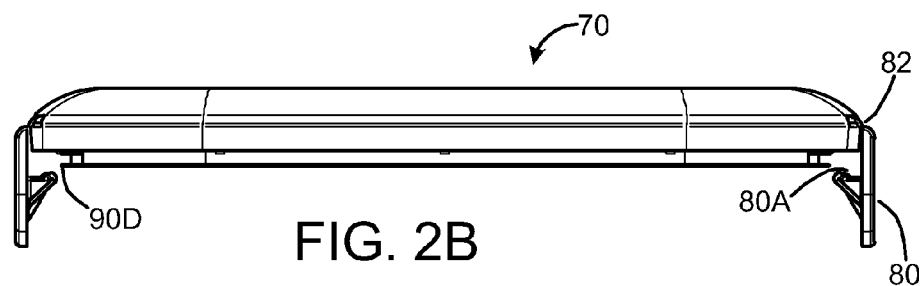
FIG. 2B is a front view of the lid of FIG. 2A.
Figure 2C:
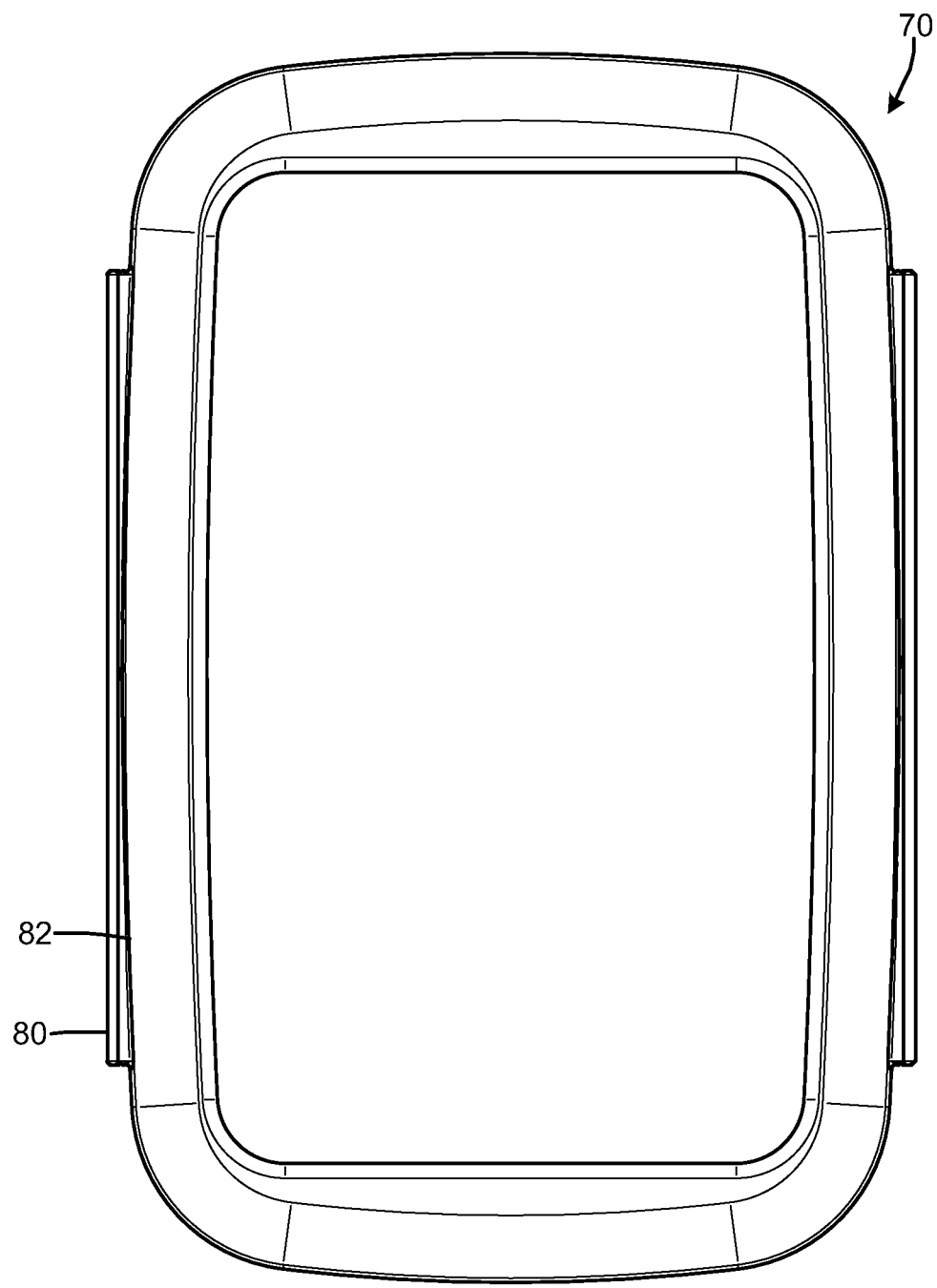
FIG. 2C is a top view of the lid of FIG. 2A.
Figure 2D:
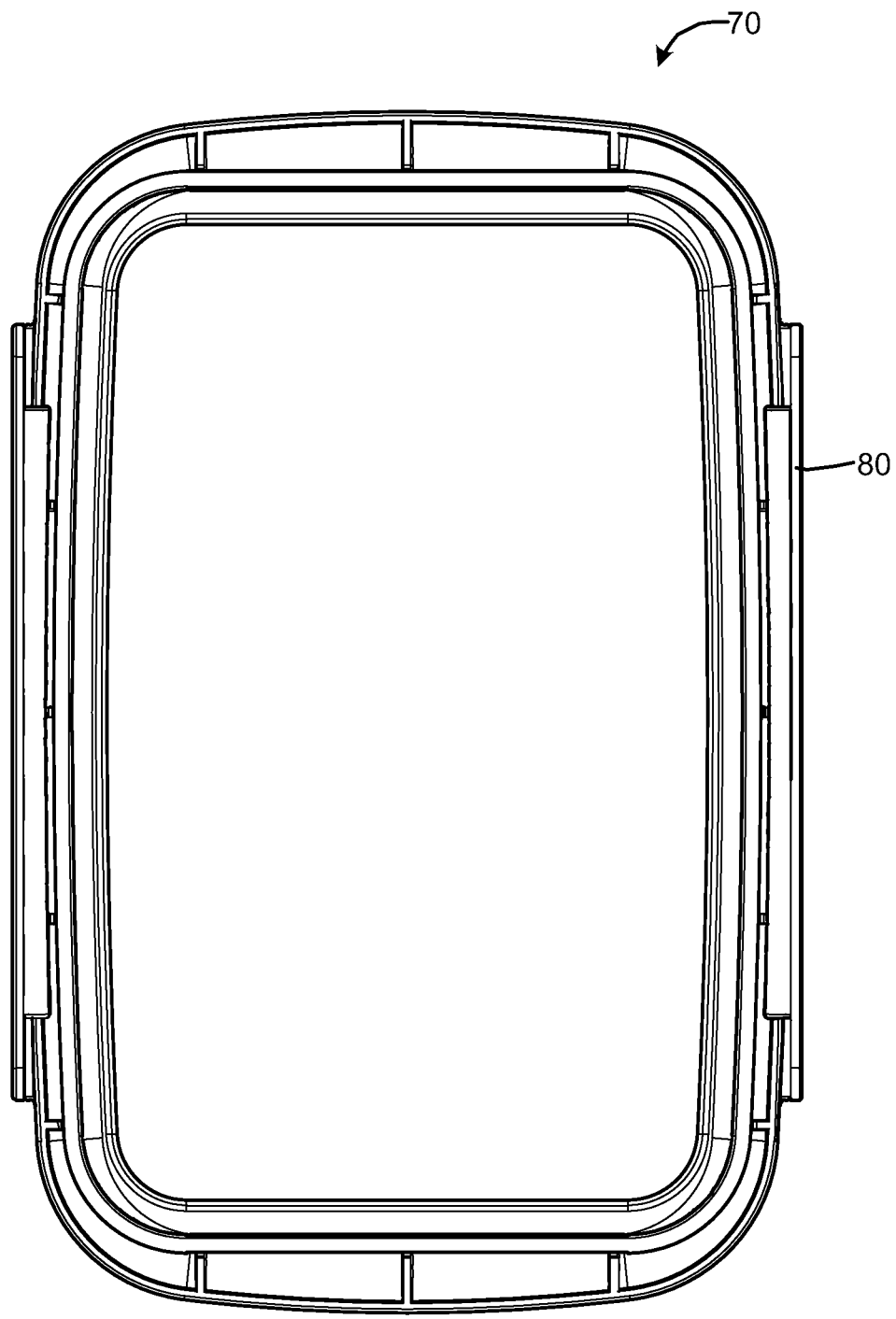
FIG. 2D is a bottom view of the lid of FIG. 2A.
Figure 3A:
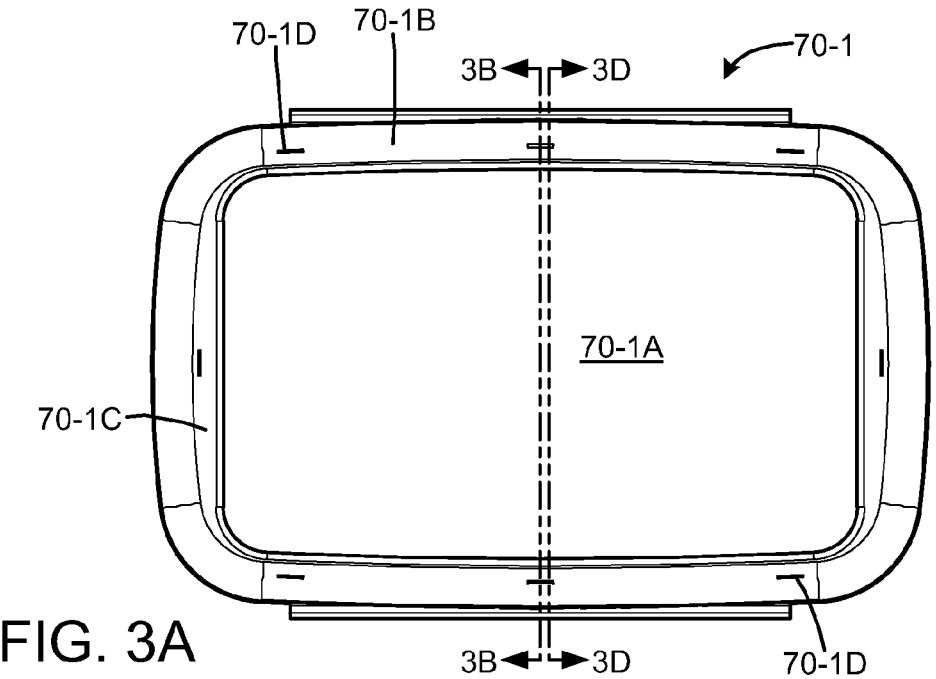
FIG. 3A is a top view of an embodiment of a first mold shot structure for an exemplary embodiment of a lid for the combination of FIG. 1A.
Figure 3B:
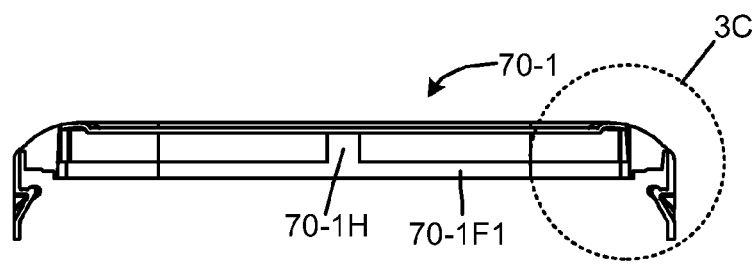
FIG. 3B is a cross-sectional view taken along line 3B-3B of FIG. 3A.
Figure 3C:
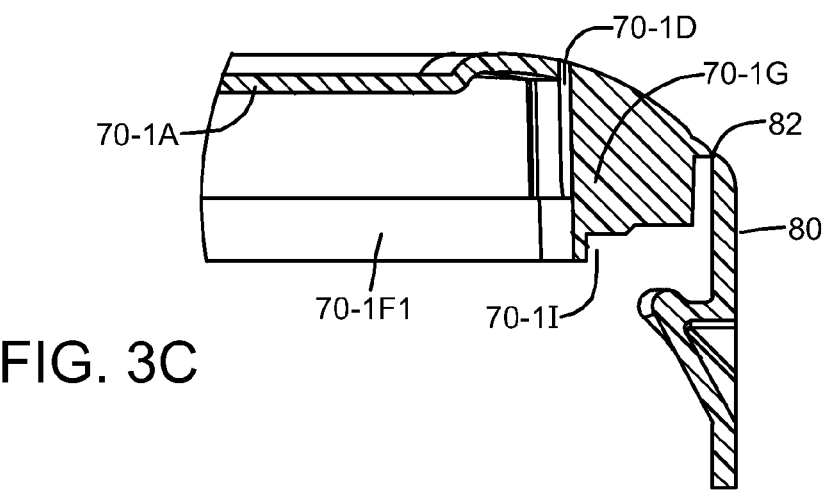
FIG. 3C is an enlarged portion of FIG. 3B, within circle 3C of FIG. 3B.
Figure 3D:
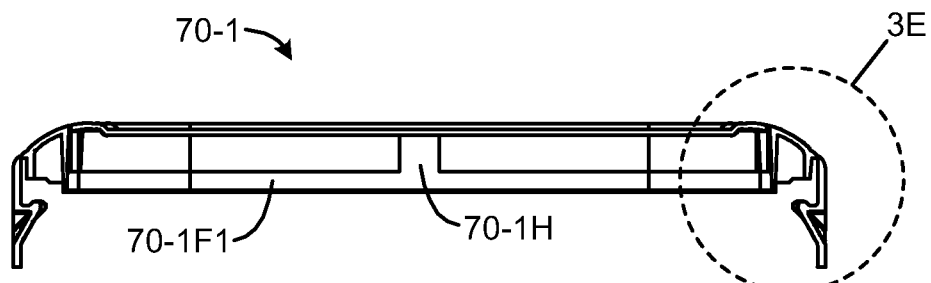
FIG. 3D is a cross-sectional view taken along line 3D-3D of FIG. 3A.
Figure 3E:
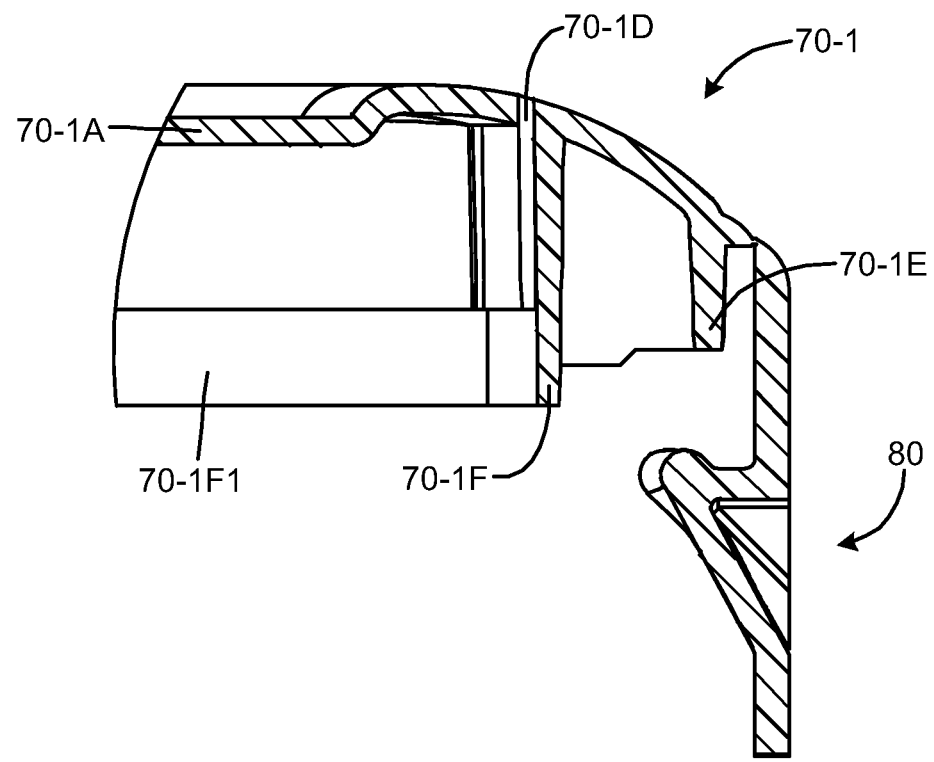
FIG. 3E is an enlarged portion of FIG. 3D, within circle 3E of FIG. 3D.
Figure 4A:
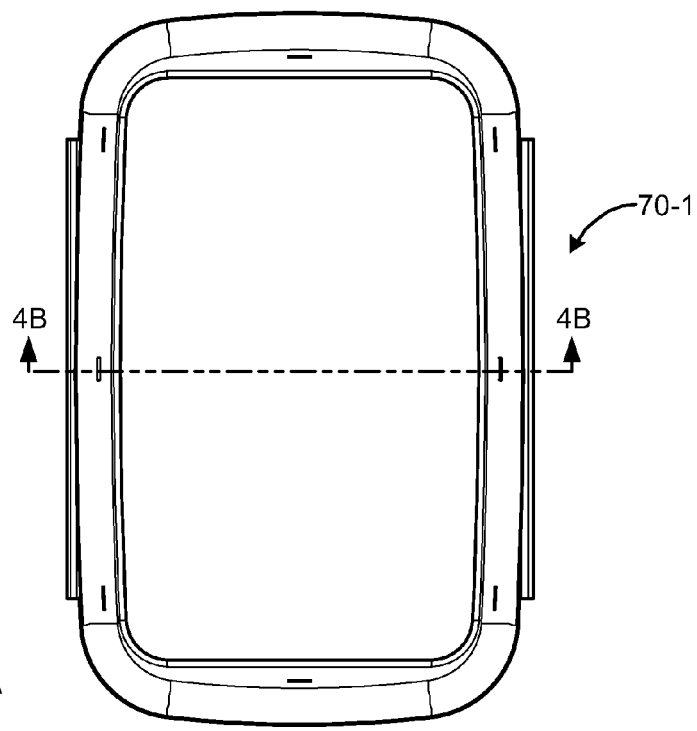
FIG. 4A is a top view of an embodiment of a first mold shot structure for an exemplary embodiment of a lid, positioned in place on a vessel.
Figure 4B:
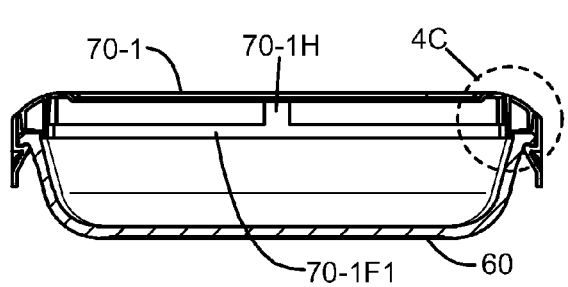
FIG. 4B is a cross-sectional view taken along line 4B-4B of FIG. 4A.
Figure 4C:
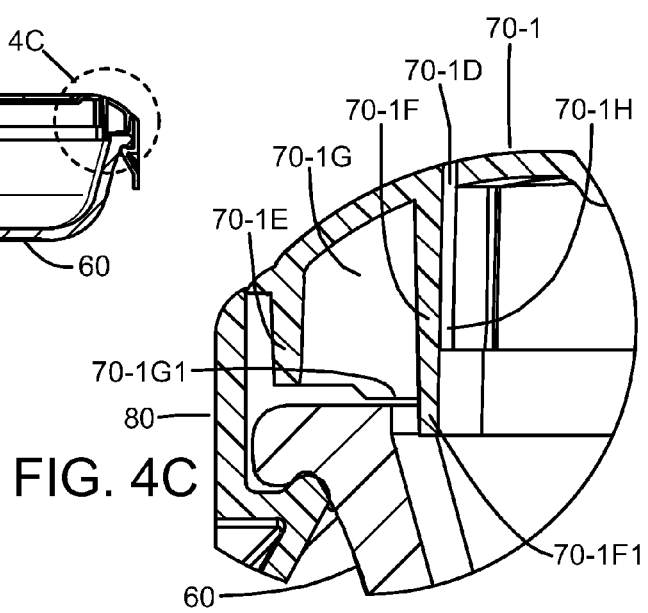
FIG. 4C is an enlarged portion of FIG. 4B, within circle 4C of FIG. 4B.
Figure 4D:
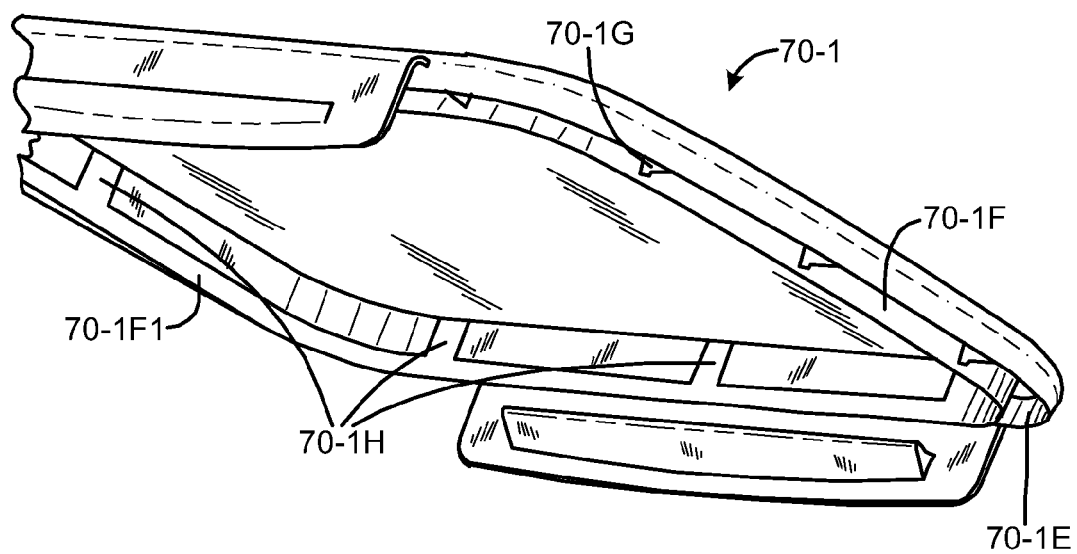
FIG. 4D is an isometric view of a portion of the first mold shot structure.

In the following detailed description and in the several figures of the drawing, like elements are identified with like reference numerals.

An exemplary embodiment of a vessel-lid combination includes a glass, ceramic or metal vessel having an open top surrounded by a peripheral edge, a lid fabricated of a plastic material, and a seal structure integrated with the lid to form a unitary structure. The lid is configured to attach to the open top by means of a latch or set of latches integrated with the lid, and the seal structure is configured to provide an air-tight seal between the lid and the peripheral edge of the vessel when the lid is attached to the vessel. In one exemplary embodiment, the vessel is a container fabricated of a glass suitable for baking or oven heating applications. In a general sense the vessel could be any container with a suitable locking lip to engage the lid latches, including plastic, ceramic or other containers.

FIGS. 1-8C illustrate an exemplary embodiment of a vessel and lid system 50, which includes a vessel 60 and a lid 70 with an integral seal structure and latches 80. The vessel 60 in one embodiment is a glass bakeware container, suitable for heating or baking food items in a hot oven. In this embodiment, the vessel 60 is made from a material which can withstand oven temperatures and cooling stresses, such as, by way of example only, borosilicate glass, which provides advantageous thermal properties for safe use under baking and cooling conditions. Other types of glass, metal or ceramic vessels can be configured for use with the lid 70, such that the vessels are formed with a sealing edge and latch engagement lip, as described more fully below.

Figure 7A:
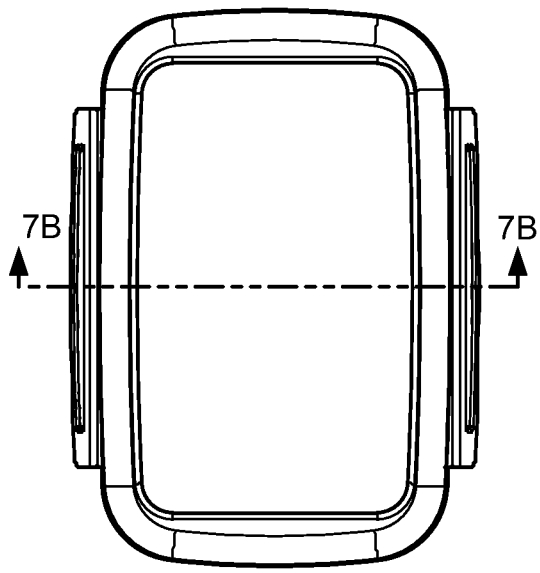
FIG. 7A is a top view of an exemplary embodiment of a vessel-lid combination as in FIG. 1A, but with the latches in an opened position.
Figure 7B:
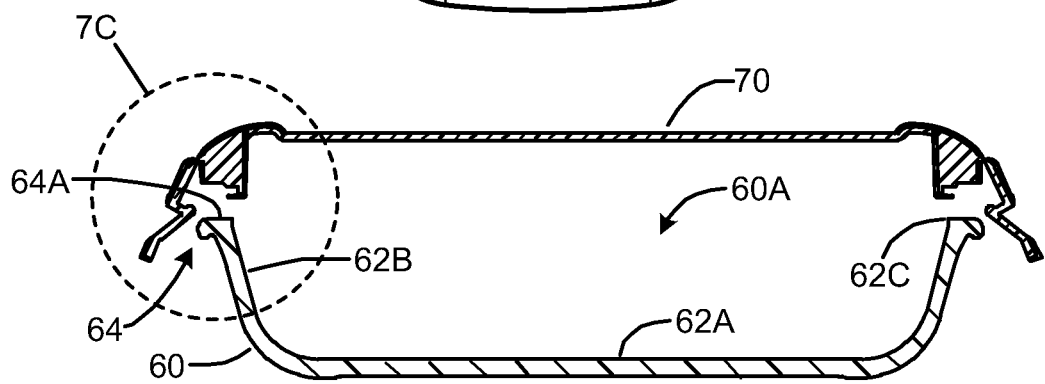
FIG. 7B is a cutaway view, taken along line 7B-7B of FIG. 7A.
Figure 7C:
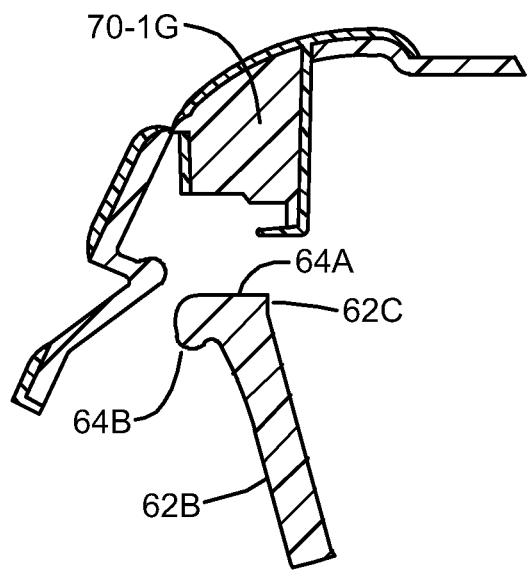
FIG. 7C is an enlarged view of the portion of FIG. 7B within circle 7C.

The cutaway view of FIG. 7B illustrates the construction of the exemplary vessel 60 in further detail. The vessel 60 is a unitary structure, having an open top region 60A, defined by a bottom portion 62A, a sidewall portion 62B and a peripheral rim portion 64. A sealing edge portion 62C is defined by the sidewall portion at or adjacent the open top region. In this example, the sidewall portion 60B is angled outwardly from the bottom region, defining a 15 angle relative to the bottom portion. This particular angular arrangement is but one example, other configurations of the sidewall and bottom portions of the vessel may alternately be employed. The rim portion 64 includes a generally flat top edge portion 64A and a latch engagement lip portion 64B.

Referring to FIGS. 1A-1D, the lid 70 is attached to the vessel 60 and latched in place to cover the open vessel top, using latches 80 connected by living hinges to the lid proper on opposite sides of the lid. The latches have latch hook features 82A which engage the latch engagement lip portion 64B of the vessel when the lid is placed on the vessel and the latches rotated about the hinges to the latched position shown in FIGS. 1A-1C, for example. A seal portion 90D engages a seal surface on the vessel as the lid is latched in place.

The lid 70 in an exemplary embodiment is fabricated by injection molding using a two shot molding technique, in which a first shot structure is fabricated of a first plastic material, and then the lid structure is completed in a second shot in which a second plastic material is overmolded to a portion of the first shot structure. In an exemplary embodiment, the primary, first shot lid structure is formed from a clear polymer such as polypropylene or similar structurally rigid polymer material. An exemplary over-mold material used in the second shot is a thermoplastic elastomer (TPE) material.

FIGS. 2A-2D illustrate the lid 70 in a completed form, i.e. after the overmolding process is completed to form the second plastic material to the first shot structure.

FIGS. 3A-3E and 4A-4D illustrate an exemplary first shot structure 70-1 for the lid 70. The first shot structure 70-1 defines a web portion 70-1A which is generally flat and is configured to extend over the open top region of the vessel when the lid is attached. The first shot structure 70-1 includes a peripheral region 70-1B extending around the periphery of the lid, and opposed end regions 70-1C at the longitudinal ends of the lid, adjacent the sides of the lid which do not support latches 80. Slot openings or channels 70-1D are formed in the first shot structure 70-1 at spaced locations around the peripheral region 70-1B and in the end portions 70-1C. In this exemplary embodiment, there are eight slots 70-1D in the first shot structure, and this number can be increased or decreased, depending on the configuration and size of the first shot structure. The slots 70-1D pass through the first shot structure from the top surface to the bottom surface of the peripheral region of the first shot structure. The structure 70-1 further includes a downwardly protruding outer peripheral sidewall portion 70-1E, and an inner peripheral rib portion 70-1F defining a lower bonding ring portion 70-1F1. Transverse rib portions 70-1G are formed between the inner rib portion and the outer sidewall portion at spaced intervals around the periphery of the first shot structure.

Once the first shot structure 70-1 has been formed, the second shot process is performed. The over-mold material applied to the first shot structure 70-1 in an exemplary embodiment is a thermoplastic elastomer material. In an exemplary embodiment, this material is molded in an injection molding process similar to that of the formation of the first shot structure 70-1, except that the first shot structure is already in the mold cavity and thereby the second shot material attaches to the first shot structure as the hot second shot material enters into the mold and onto the first shot structure. The second shot material is located preferentially based of the design of the mold to fill the desired locations. The two shot process in a general sense is widely used. The second shot material is selected to provide good adhesion to the material of the first shot structure 70-1. The second shot material, in an exemplary embodiment, may also be selected to provide appropriate bending characteristics, and a high coefficient of friction with the vessel material to ensure a high quality seal. The second shot material may also be selected to have good tear strength so as to retain good sealing over time. For the exemplary embodiment in which the vessel is fabricated of borosilicate glass, the first shot structure may be polypropylene or similar structurally rigid polymer material, and the over-mold material used in the second shot is a thermoplastic elastomer (TPE) material.

In an exemplary embodiment, the second shot material covers at least the peripheral top edge portion 70-1B of the first shot structure, and flows through flow channels to the peripheral underside of the first shot structure. A first portion of each flow channel is formed by the slots or channels 70-1D formed in the first shot structure 70-1. The flow channels provide a path for the second shot material to flow through the top surface of the lid, down the height of the vertical rib 70-1F to reach the sealing area 70-1I, where the second shot material defines a peripheral flexible seal portion. The flow channels include vertical path portions 70-1H below each slot 70-1D, which are recessed into the rib portion 701-F.

In an exemplary embodiment, there are three main parts to the flow channels for the molten second shot materials. The first part is the opening or through holes 70-1D in the lid top. The second part is the vertical flow path portions 70-1H defined by the recesses in the inner rib 70-1F. The third portion of the flow path is provided by the bonding ring portion 70-1F1 of the inner rib portion. The bonding ring portion 70-1F1 provides additional adhesion surface area all around the sealing area 70-11, where the second shot material will experience stress from repeated opening and closing of lid.

The ribs 70-1G are formed at multiple locations around the periphery of the lid providing rigidity to the lid and a stop for the application of the lid to the vessel. The cross-section of the rib shows how the rib provides a stop surface 70-1G1 for the consumer to know when the lid is in place and when it is appropriate to engage the latch with the vessel.

Figure 5D:
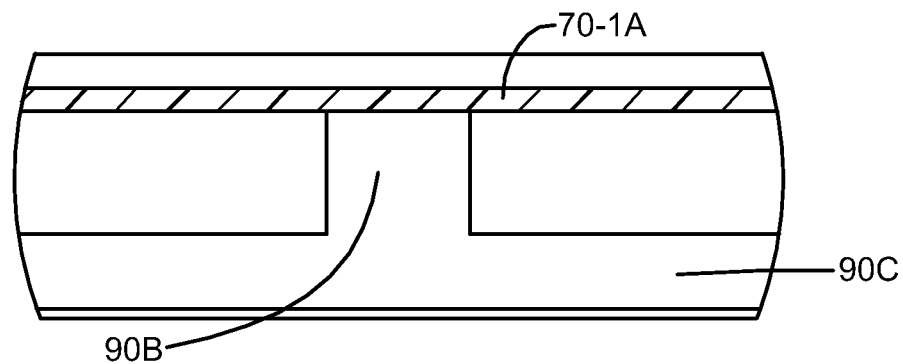
FIG. 5D is an enlarged portion of FIG. 5B, within circle 5D of FIG. 5B.
Figure 5E:
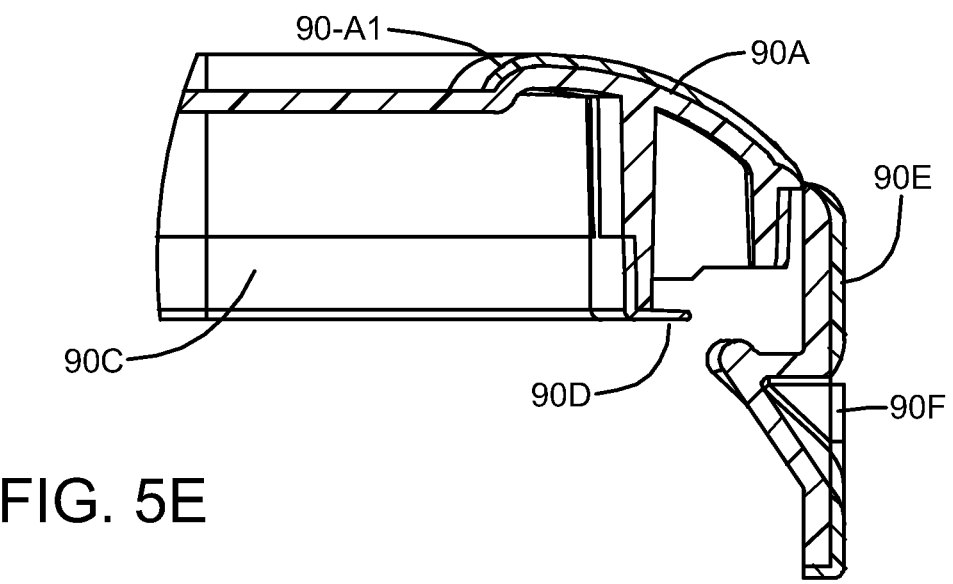
FIG. 5E is an enlarged portion of FIG. 5B, within circle 5E of FIG. 5B.
Figure 5F:
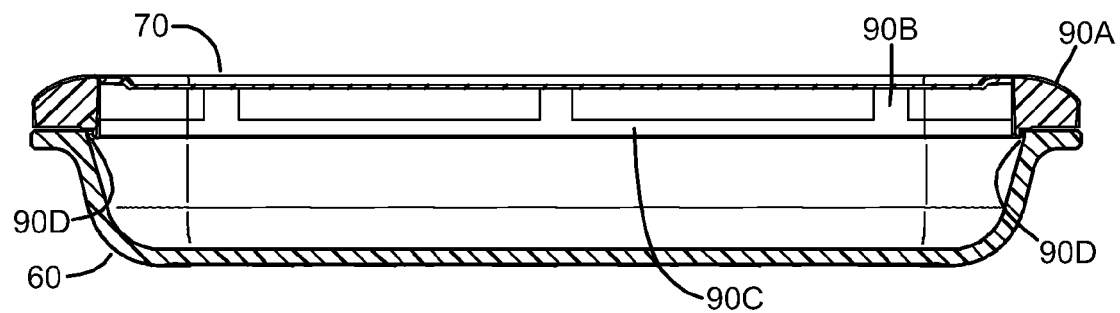
FIG. 5F is a cross-section view taken along line 5F-5F of FIG. 5A, as latched onto a vessel as in FIG. 1A.

An exemplary embodiment of the lid 70 after completion of the second shot is illustrated in FIGS. 5A-7C. In FIGS. 5A and 5B, the stippled areas designate second shot material. The second shot material produces layers or features generally indicated by reference "90_", including the top peripheral layer 90A, a layer 90B on each vertical flow channel portion 70-1H, a layer 90C formed on the bonding ring portion 70-1F1, which extends around the bottom edge of the bonding ring portion to form the peripheral seal portion 90D. It is the circumferential seal portion 90D, extending about the entire periphery of the bonding ring portion, that engages the sealing surface 62C of the vessel 60 to create an air-tight seal. The seal portion 90D forms a flexible flap which bends as the lid is placed in position on the vessel, and is bent upwardly as the lid is latched, as shown, for example, in FIGS. 5F, 8B and 8C. In this exemplary embodiment, the second shot material includes layers 90E and 90F formed on the latches 80.

Figure 8:
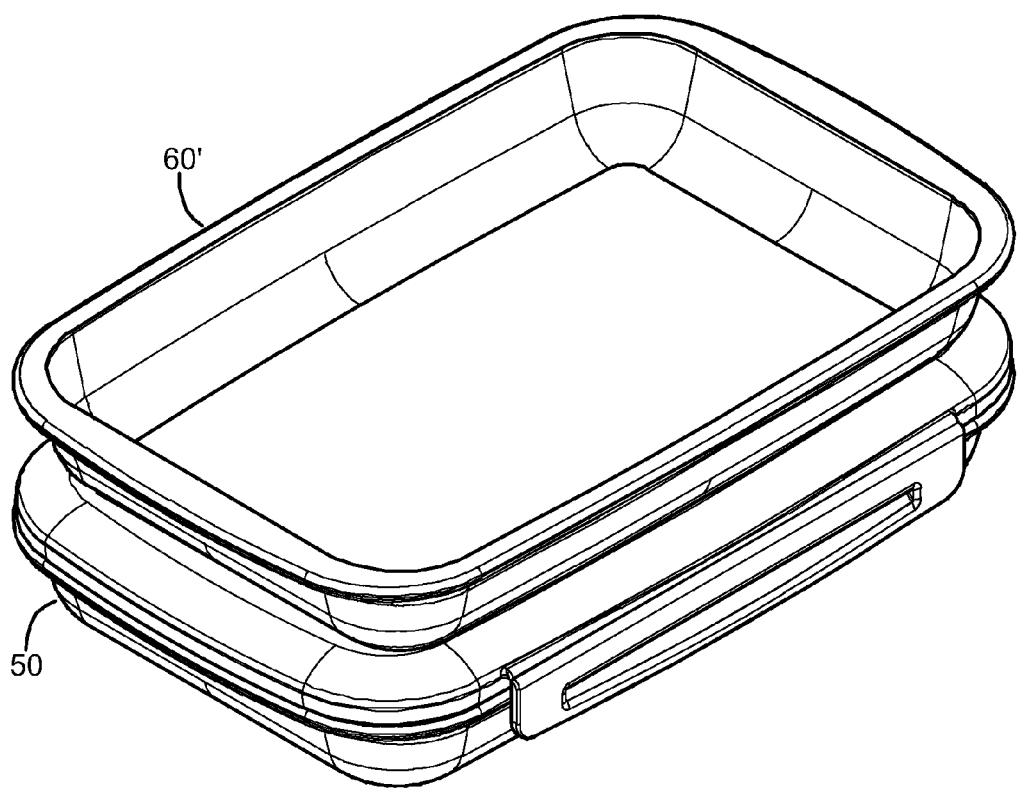
FIG. 8 is an isometric view showing an exemplary embodiment of a vessel-lid combination as in FIG. 1A, with another like vessel in a stacked configuration.
Figure 8A:
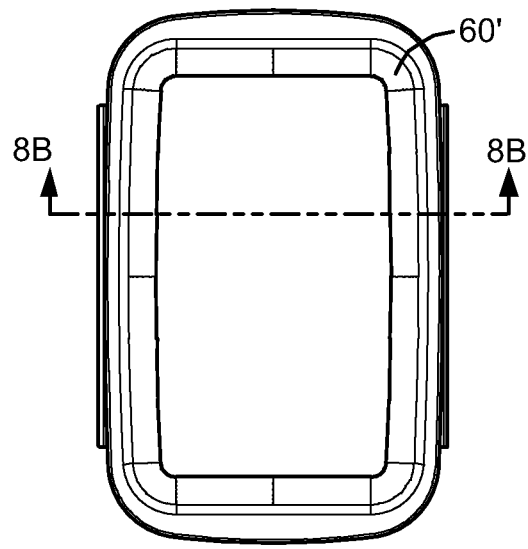
FIG. 8A is a top view of the stacked configuration of FIG. 8.
Figure 8B:
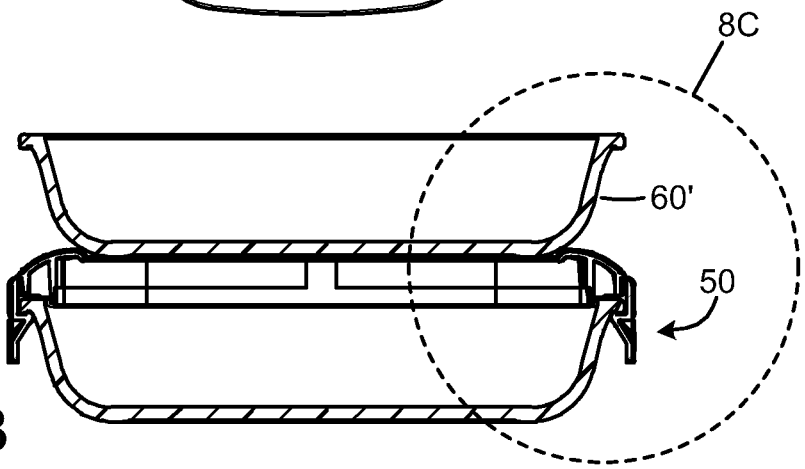
FIG. 8B is a cutaway view taken along line 8B-8B of FIG. 8A.
Figure 8C:
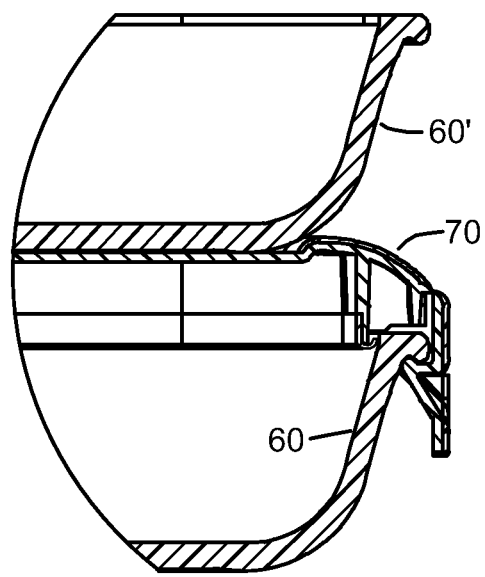
FIG. 8C is an enlarged view of the portion of FIG. 8C within circle 8C.

The lid web surface portion 70-1A in this exemplary embodiment is substantially flat or planar to receive a like vessel or any other item that would require stacking. The peripheral portion 70-1B is generally raised with respect to the web surface portion, and portion 70-1B and end portions 70-1C are covered with the second shot or over-mold material layer 90A. The over-mold layer 90A covering the raised peripheral portion 70-1B provides a peripheral retention surface 90A-1. The over-mold layer 90A, as previously mentioned, is preferentially made of a material (such as TPE) with a high coefficient of friction with glass and other materials to aid in the retention of the stacking items. The retention surface 90A-1 is designed to fit a like vessel appropriately snugly with sufficient manufacturing tolerance for a glass vessel manufacturing process. The stacking of a vessel on the lid of a vessel-lid system is illustrated in FIGS. 8A-8C.

In the exemplary embodiment of the lid 70 depicted in FIGS. 1A-5F, the hinges 82 are molded in a living hinge arrangement as part of the first shot structure 70-1, and are fabricated of the same material as the first shot, e.g. polypropylene or similar structurally rigid polymer material. A living hinge is typically made from a polymer having long chains where the thinning out of the cross section allows for the chains to align parallel to the hinge allowing the chains to bend or hinge but due to the length of the chains reaching both thicker sections of plastic on both sides the chains connect the two sides. The chains are very strong in tension. The second shot material, e.g. TPE, or over-mold does not cover the hinge 82 in this exemplary embodiment, but covers the first shot material on both sides of the hinge area.

In this exemplary embodiment, the ends 82A, 82B of the hinges 82 are enclosed by a thickness of (TPE) or over-mold, e.g. as illustrated in FIGS. 6A-6C. This accomplishes two things. First the living hinge ends act as a tear strip. Typically living hinges are subject to tearing off once a tear has been initiated at one of the ends. The highly elastic over-mold material at either end of the hinge acts to protect the hinge from tearing. In addition the hinge ends act as another flow channel for the second shot or over-mold to flow from the main body of the lid onto the latch area. This can also be achieved by placing additional gates on each location where the second material is desired. However in this embodiment the tooling and manufacturing process is much simplified allowing fewer simpler gates and far more process control.

Figure 9A:
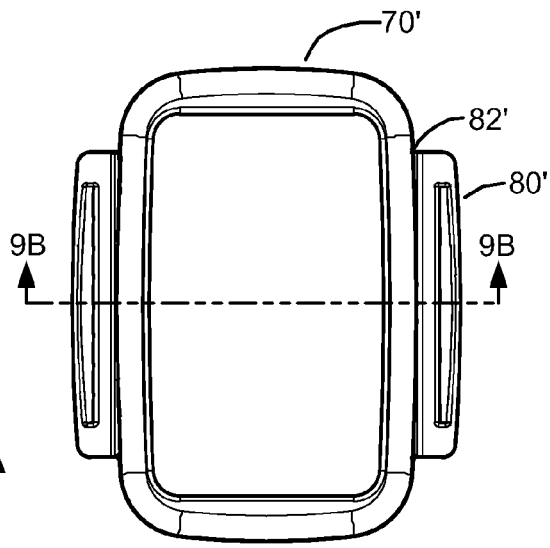
FIG. 9A is a top view of an alternate embodiment of a lid.
Figure 9B:
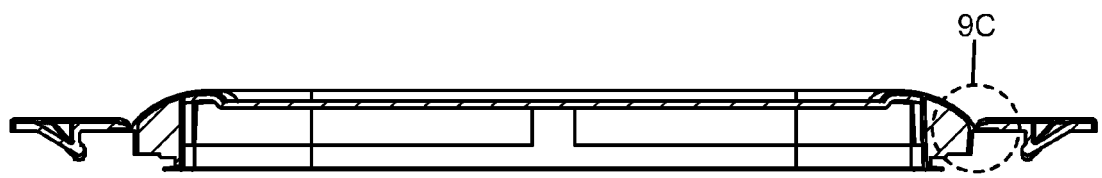
FIG. 9B is a cross-sectional view of the lid of FIG. 9A, taken along line 9B-9B of FIG. 9A.
Figure 9C:
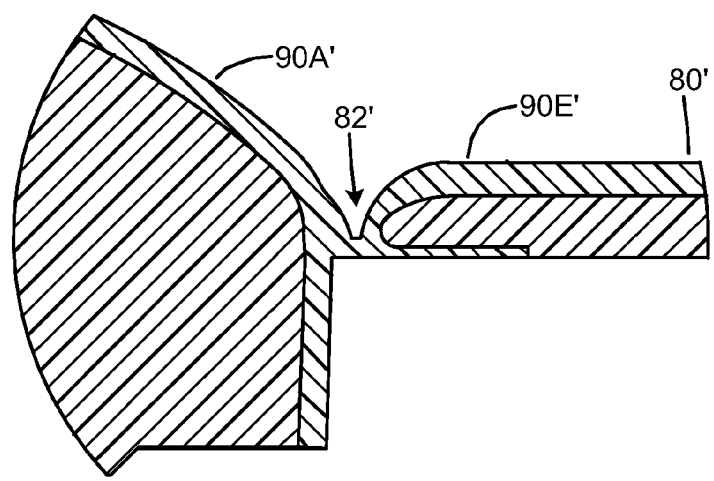
FIG. 9C is an enlarged view of the portion of FIG. 9B within circle 9C.

In an alternate embodiment, the hinge 82' is formed by the second shot, not the first. The latch is attached by the second shot. Through holes are provided in the latch body to allow for improved bonding with mechanical bond with both materials. FIGS. 9A-9C illustrate this alternate embodiment of a hinge 80' for the lid 70' in which the latch 80' is attached to the lid body proper by the second shot layer forming a living hinge 82'.

Figure 10A:
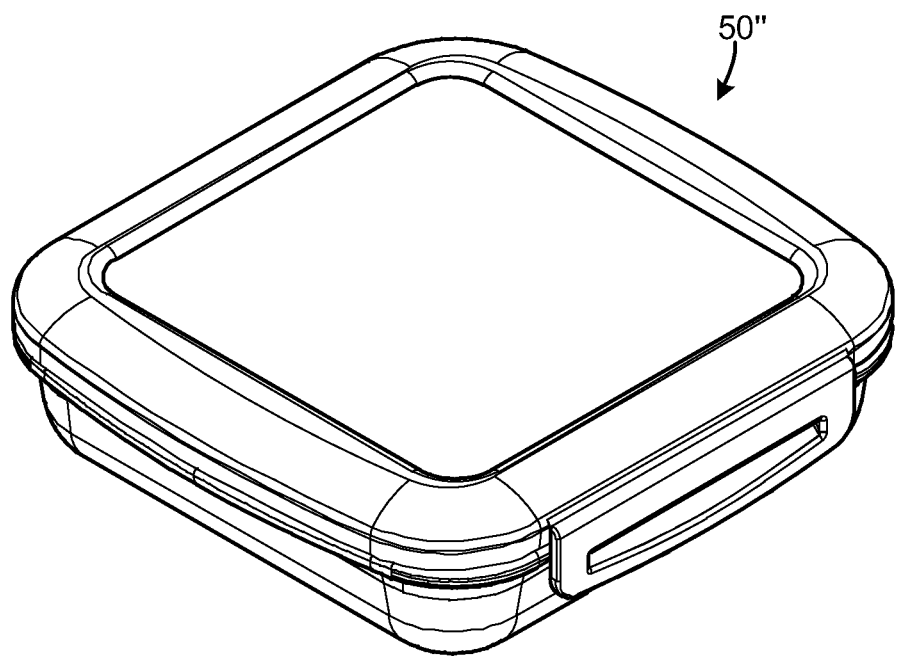
FIGS. 10A and 10B are respective isometric views of alternate embodiments of a vessel-lid combination.
Figure 10B:
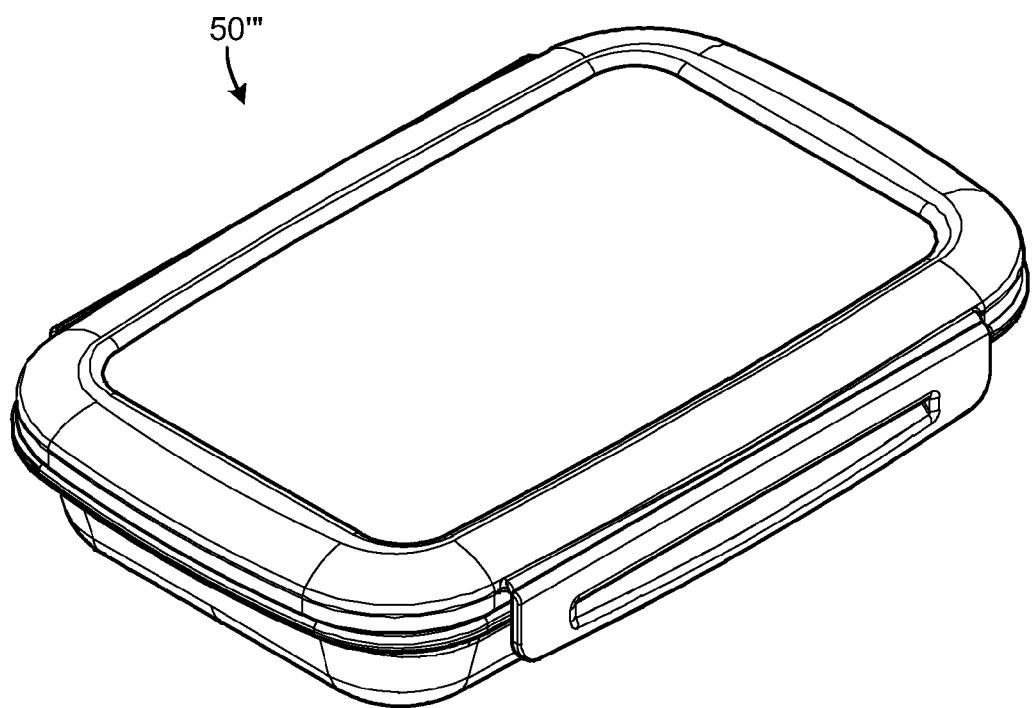

The vessel and lid air-tight seal configuration may be employed on vessels of different sizes and configurations. For example, FIG. 10A a square vessel and lid configuration 50". FIG. 10B shows another rectilinear vessel and lid configuration 50'".

A further embodiment 50"" of a vessel and air-tight lid combination is illustrated in FIGS. 11A-13F. This exemplary embodiment includes a vessel 60 and lid 170. The exemplary vessel 60 may be identical to the vessel described above regarding the exemplary embodiment of FIG. 1A, for example. The lid 170 differs from the lid 70 of FIG. 1A in several respects. The lid 170 has a peripheral downwardly extending skirt or outer peripheral edge, defining a lid perimeter which is slightly larger than the perimeter of the vessel, so that the skirt facilitates alignment of the lid onto the vessel. The lid skirt may be provided with a lead-in chamfer or angle to further facilitate alignment of the lid onto the vessel. In this exemplary embodiment, no second shot material is molded onto the top surface of the lid, providing a cost reduction advantage relative to the embodiment of FIG. 1A. Relatively thick second shot flow leaders are formed on the underside of the lid peripheral region to facilitate each of injection of the molten material of the second shot. Stop ribs are formed in the underside of the lid peripheral region to define a correct latched position of the lid on the vessel, even thought the lid perimeter is larger than the vessel perimeter. These features are illustrated in FIGS. 11A-13G.

Figure 11A:
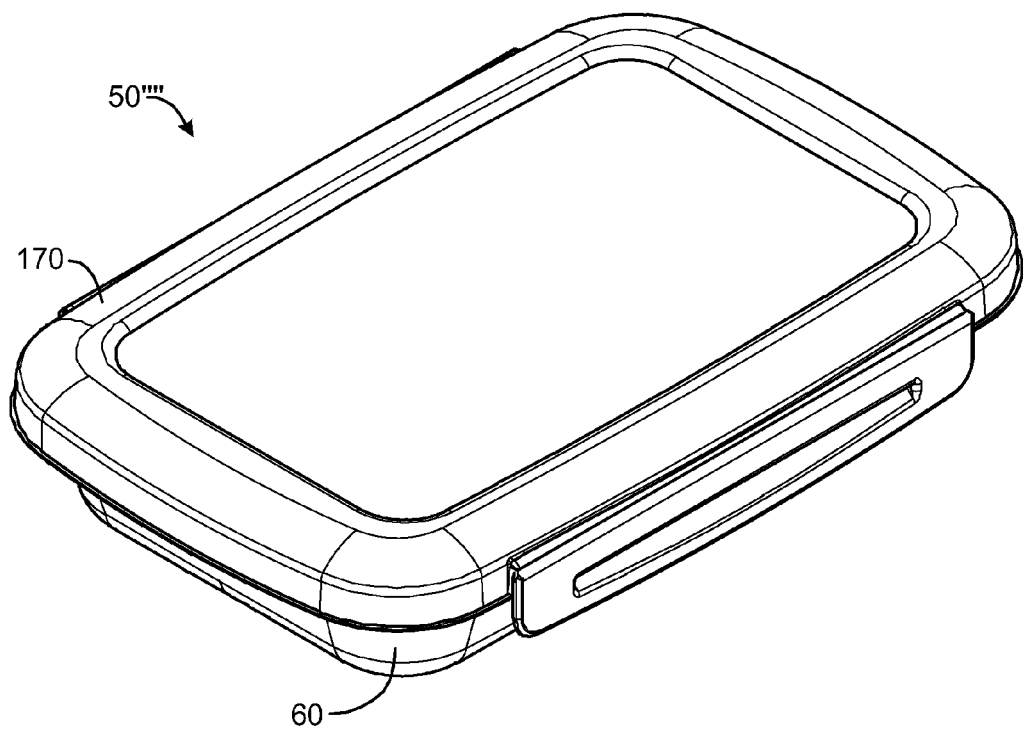
FIGS. 11A, 11B and 11C are respective isometric, bottom and end views of another exemplary embodiment of a vessel-lid combination.
Figure 11B:
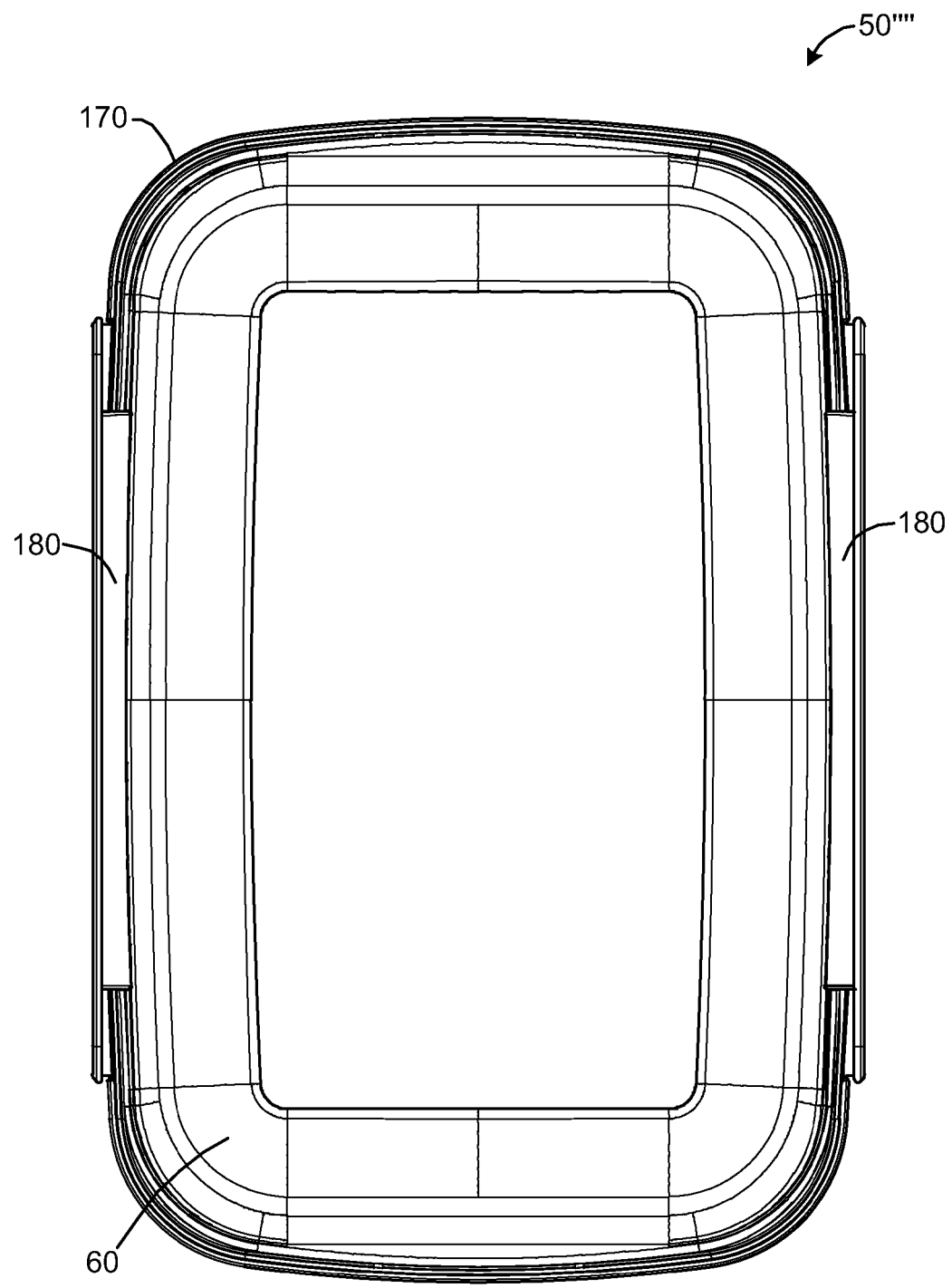
Figure 11C:
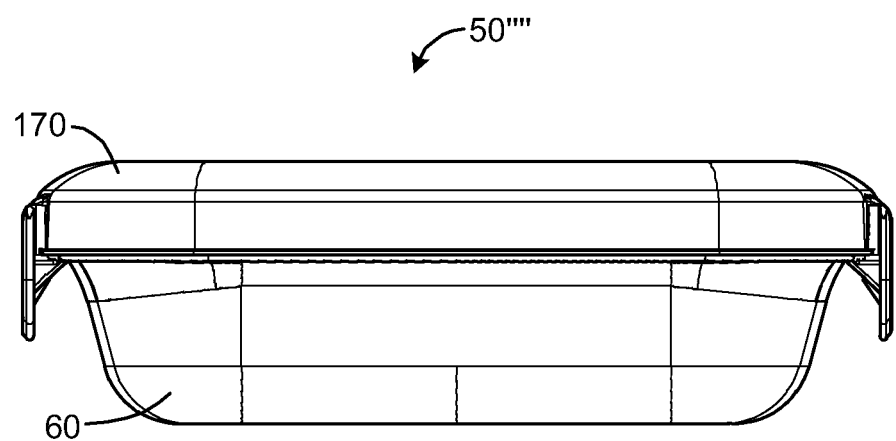

FIGS. 11A-11C are respective isometric, bottom and end views of the vessel and air-tight lid combination 50"" including the vessel 60 and with the lid 170 in a latched condition on the vessel. The constituent materials of the vessel and the lid, both the first shot material and the second shot material, may be identical to those of the embodiments of FIGS. 1-11.

Figure 12A:
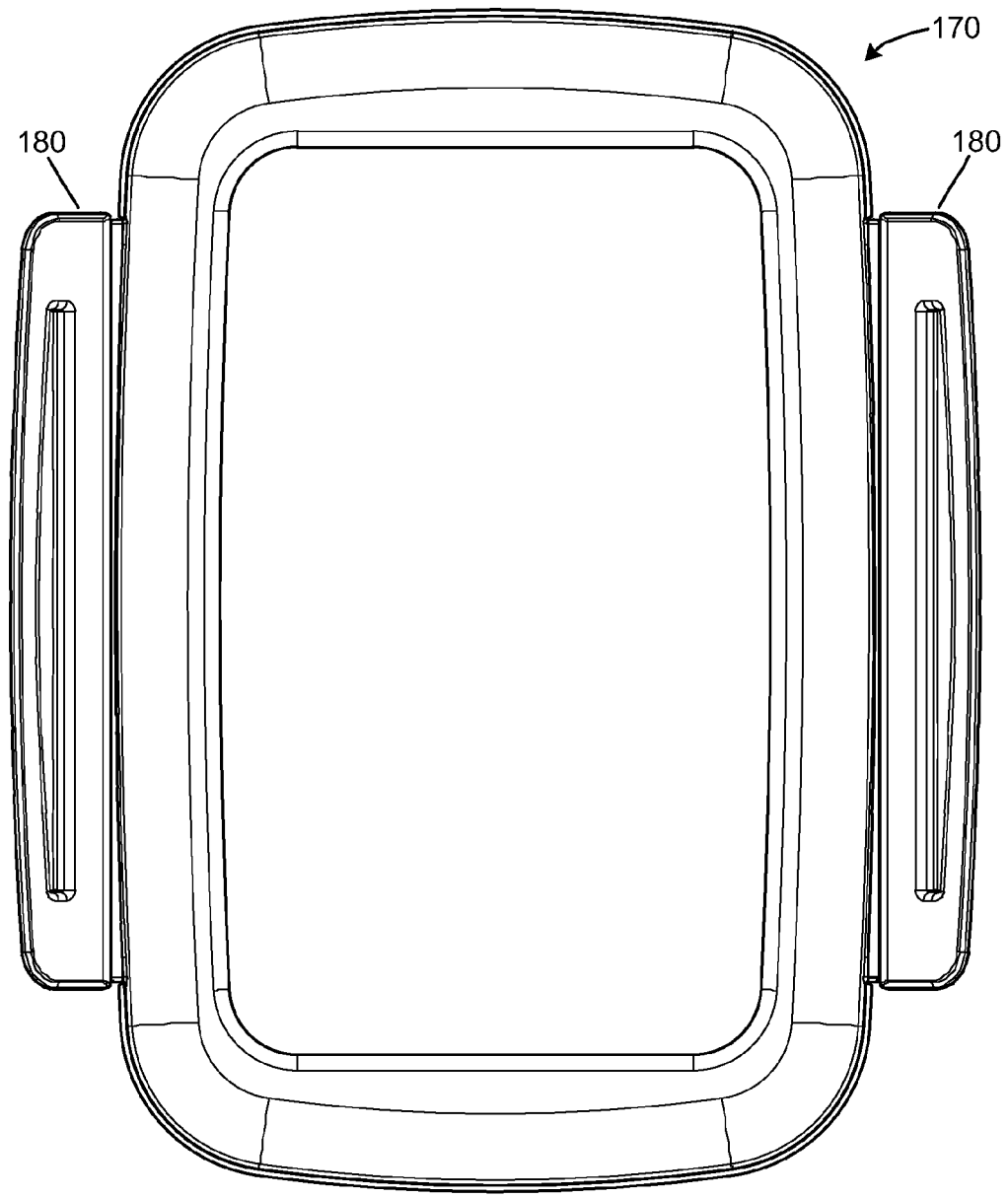
FIG. 12A is a top view of the lid of the combination of FIG. 11A, with the latches in an open position.
Figure 12B:
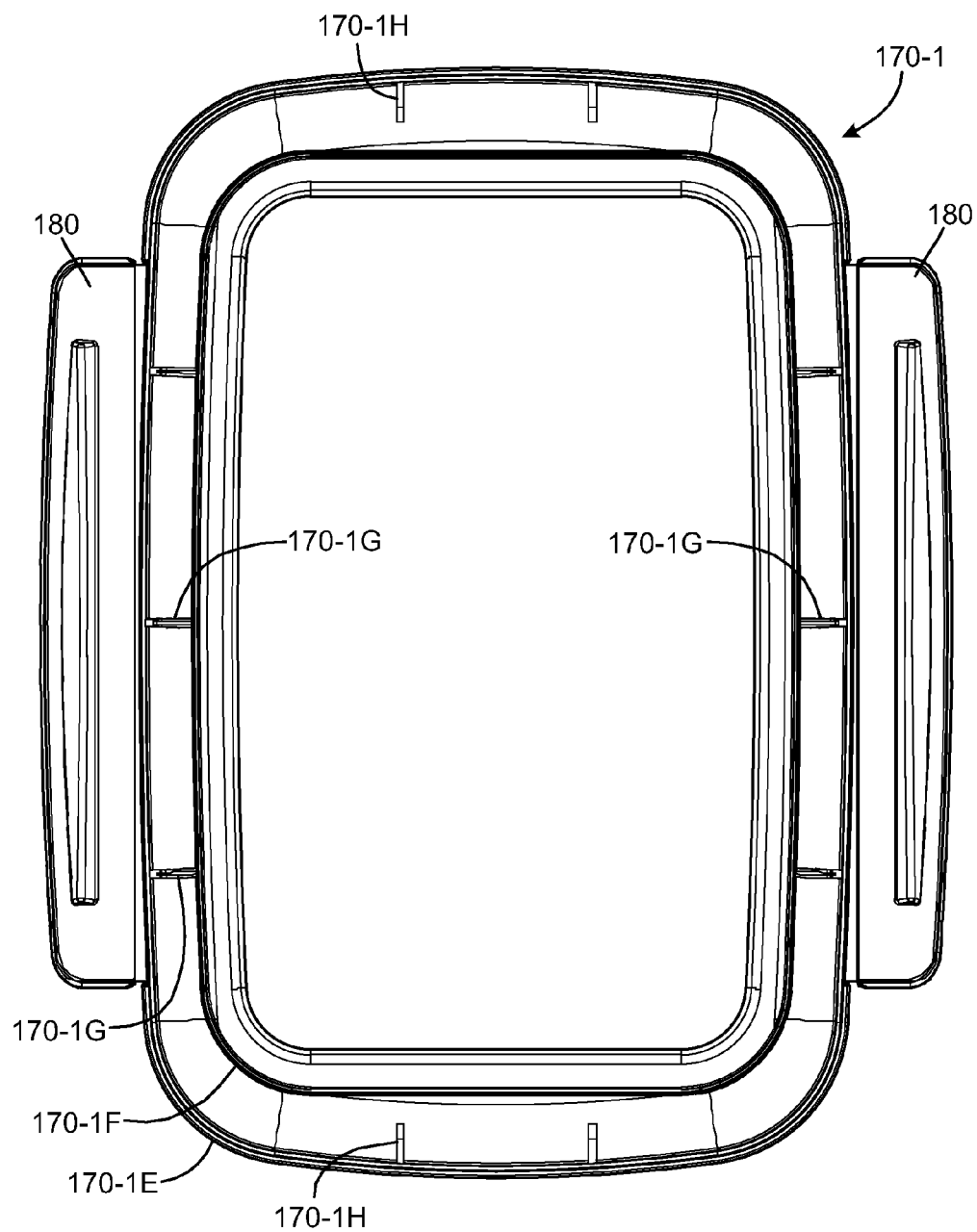
FIGS. 12B and 12C are respective bottom views of a lid as in FIG. 11A, without the seal (a first shot structure) and with the seal after a second molding shot.

FIG. 12A is a top view of the lid 170. In this exemplary embodiment, no second shot material is molded onto the top surfaces of the lid, visible in this top view. FIG. 12B is a bottom view of the first shot structure 170-1, with the latches 180 rotated about the living hinges to an unlatched configuration. The first shot structure 170-1 includes a downwardly protruding outer peripheral sidewall portion 70-1E, and an inner peripheral rib portion 170-1F. Transverse rib portions 170-1G are formed between the inner rib portion and the outer sidewall portion at spaced intervals on the longitudinal sides of the first shot structure, three on each longitudinal side in this example. In this embodiment, the rib portions 170-1G provide attachment bosses for injection leader portions of the second shot material. The second shot structure 170-1 also includes stop ribs 170-1H at the transverse end portions of the second shot structure, in this example, two on each transverse end portion. These stop ribs have a depth sufficient to prevent the lid from being inserted too far into the vessel during an attachment.

Figure 12C:
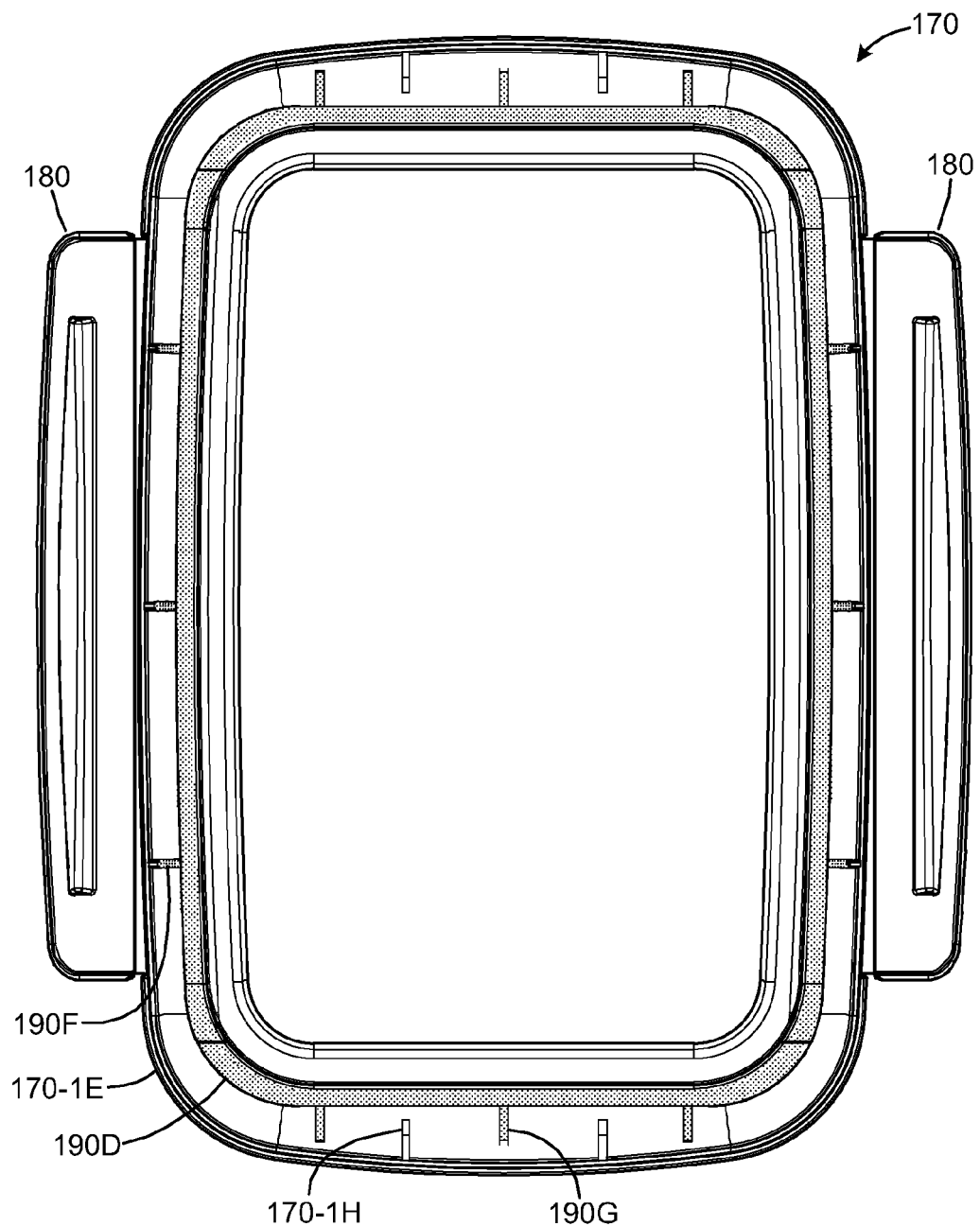

FIG. 12C is a bottom view, showing the lid 170 in its completed form, after the second shot material has been overmolded onto the first shot structure. The second shot material includes a region overmolded onto the inner rib 170-1F of the first shot structure, and defining the peripheral seal 190D. The overmolded second shot material is shown as the stippled regions in FIG. 12C. It is noted that, during the second shot molding process, the second shot material is injected at injection leader regions 190F on the transverse rib or boss portions 170-1G, and on narrow portions of the underside of the lid peripheral edge at the transverse end portions, as injection leaders 190G. The bosses 170-1G provide support for the second shot material, and provide crush force tending to compress the injection leader regions 190F as the lid is latched onto the vessel.

The peripheral seal 190D is dimensioned to provide appropriate seal force on the vessel and to accommodate the dimensional variations in the vessel due to manufacturing tolerances. The thickness of the seal may be selected to provide an appropriate flexing as the lid is positioned on the vessel and latched. In one example, the seal may have a width in a range of about 2.5 to 4 mm and a thickness at its thickest dimension on the order of 1 mm or so. The dimensions of the seal 190D including its width and also its elevation position may vary spatially around the perimeter of the lid. This variation in dimensions can accommodate spatial variations in the vessel tolerance. For example, the tolerances in a rectangular vessel are typically greater in its corners, and the seal may be wider in the corners to accommodate wider dimensional variations. Also the elevation of the seal may vary, with the seal positioned lower in the corners relative to the vessel top edge.

Figure 13A:
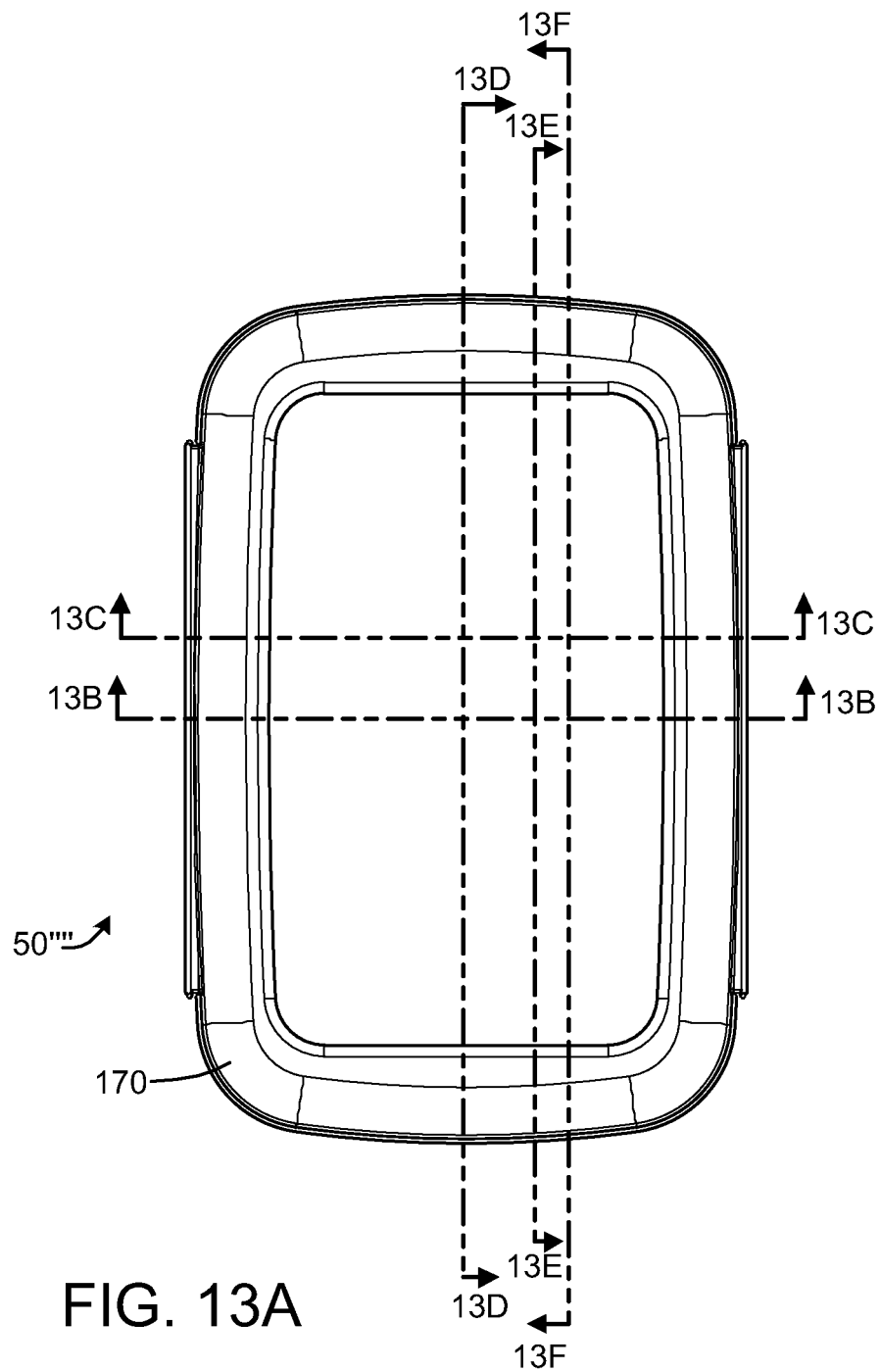
FIG. 13A is a top view of a lid as in the vessel-lid combination of FIG. 11A.
Figure 13C:
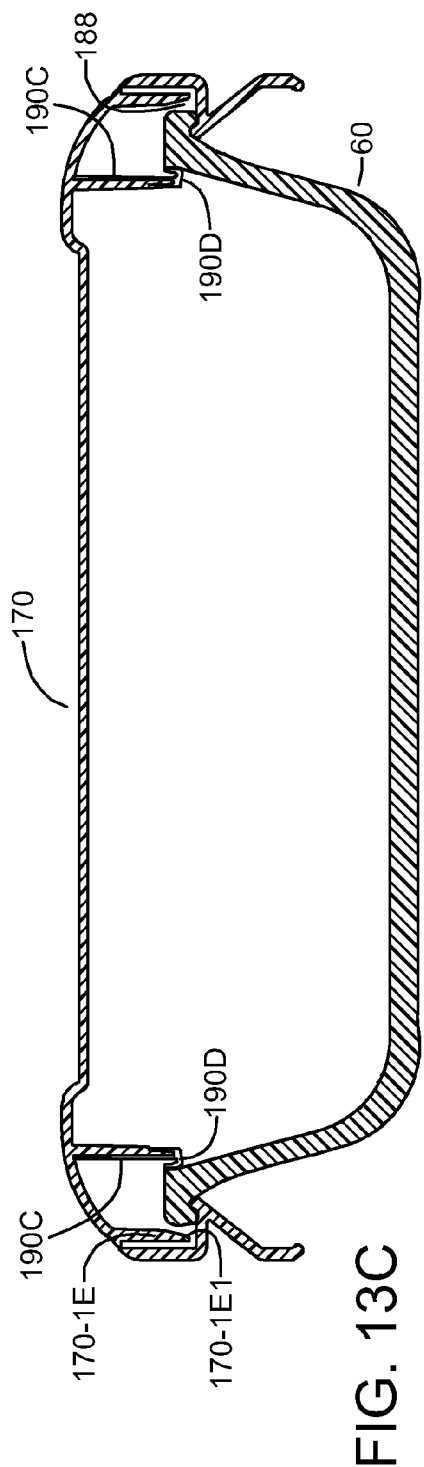
Figure 13B:
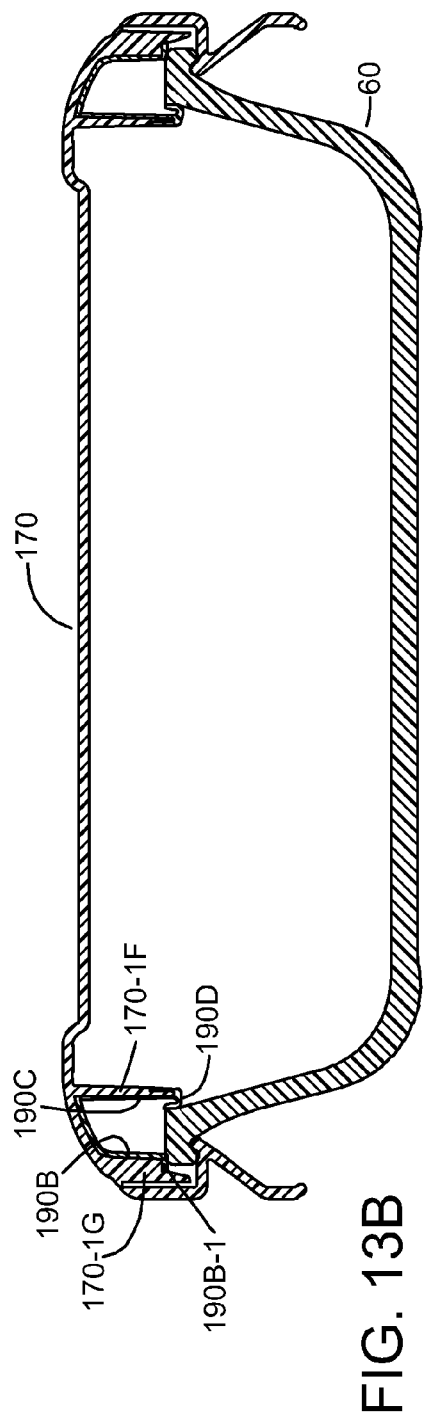

FIGS. 13A-13G illustrate the features of the lid 170 and vessel-lid combination 50"" in further detail. The lateral cross-sectional view of FIG. 13B, taken through line 13B-13B of FIG. 13A, is taken through one of the ribs or bosses 170-1G, and shows the second shot leader portion 190B, with terminal portion 190B-1 at a crush region, being compressed between the edge of the vessel and the shoulder defined by the rib 170-1G. FIG. 13B also shows the second shot region 190C formed on the outer side of the inner peripheral rib 170-1F, around the rib tip and partially up the inner side of the rib, also forming the seal 190D.

FIG. 13C is a lateral cross-section taken along line 13C-13C of FIG. 13A through the combination 50"", away from the ribs 170-1G, and shows the tapered edge 170-1E1 of the outer peripheral rib of the lid 170. FIG. 13C also illustrates the oversize of the lid outer peripheral rib 170-1E relative to the outer edge of the vessel 60, with a small gap 188 between the rib and the vessel edge.

FIG. 13D is a longitudinal cross-sectional view taken along line 13D-13D of FIG. 13A, through a second shot injection leader region 190G at each lateral or end region of the lid 170. The injection leader region 190G, the second shot region 190C and the seal 190D are shown in FIG. 13D.

FIG. 13E is a longitudinal cross-sectional view taken along line 13E-13E of FIG. 13A, through the stop ribs 170-1H at either end of the lid. FIG. 13E shows the base of the stop ribs resting on the upper surface of the vessel edge, supporting the lid from further downward movement of the lid.

Figure 13F:
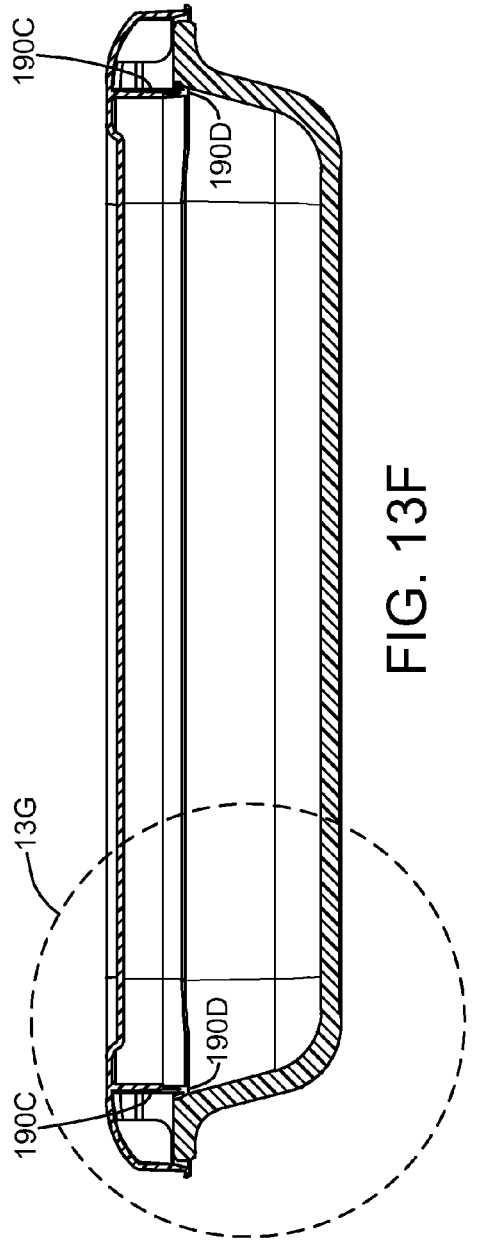
Figure 13G:
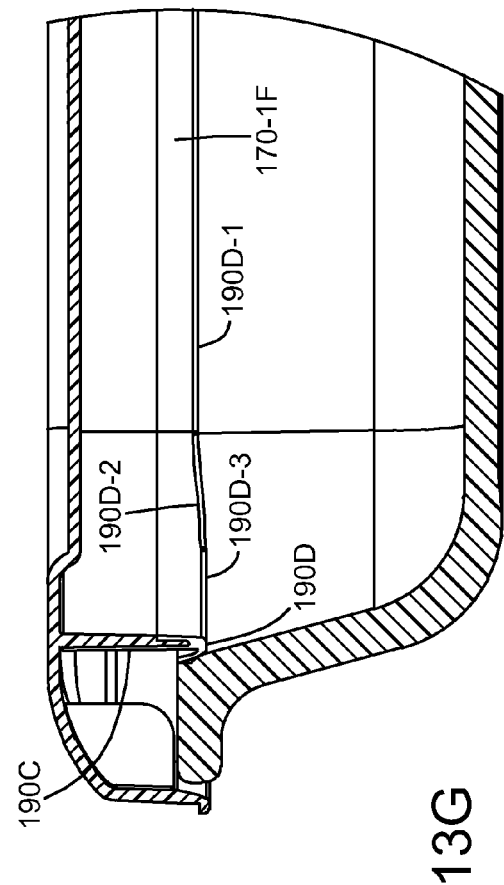
FIG. 13G is an enlarged fragmentary view of the portion of FIG. 13F within circle 13G.

FIG. 13F is another longitudinal cross-sectional view, this one along line 13F-13F of FIG. 13A, and offset from the stop ribs and the injection leader regions. FIG. 13G is an enlarged view of a fragment of FIG. 13F within the phantom circle 13G. These views illustrate an exemplary variation in the elevation of the seal 190D around the periphery of the lid, showing the transition in height of the seal 190 in a corner of the lid, to accommodate variations in the dimensions of the vessel, which typically has larger manufacturing tolerances in the vessel corners. In FIG. 13G, the seal portion 190D-1 along the longitudinal side of the lid transitions in elevation to seal portion 190D-2 approaching the lid corner, and to a lower elevation for corner seal portion 190D-3. The inner peripheral rib 170-1F also transitions in elevation, to position the seal at the appropriate elevation.

Although the foregoing has been a description and illustration of specific embodiments of the subject matter, various modifications and changes thereto can be made by persons skilled in the art without departing from the scope and spirit of the invention.

The invention claimed is:

1. A container and air-tight lid system, comprising:
 a glass, ceramic or metal vessel having an open top surrounded by a peripheral edge portion;
 a lid including a lid portion fabricated of a plastic material, and a seal structure portion formed of an elastomeric material, the seal structure portion integrated with the lid portion to form a unitary lid-seal structure wherein the seal structure portion is permanently attached to the lid portion;
 the lid configured to attach to the vessel open top by means of a latch or set of latches integrated with the lid portion, and the seal structure is configured to provide an air-tight seal between the lid portion and a sealing surface portion of the peripheral edge of the vessel when the lid is attached to the vessel;
 wherein the vessel further includes a latch engagement lip portion configured for engagement with the latch or set of latches integrated with the lid;
 wherein the lid portion includes a web portion which is configured to extend over the open top region of the vessel when the lid is attached, a peripheral region extending about the periphery of the lid, a downwardly protruding outer peripheral sidewall portion and a downwardly protruding inner peripheral rib defining a lower ring portion, and wherein said outer peripheral side wall portion defines a lid perimeter larger than a perimeter of the vessel and facilitates alignment of the lid onto the vessel; and
 wherein said lid has a rectilinear configuration, the latch or set of latches includes first and second latches on opposed first and second sides of said lid, and said lid includes stop ribs defined in opposed third and fourth sides of the lid having a depth sufficient to control the depth of insertion of the lid onto the vessel.

2. The system of claim 1, wherein the plastic material is polypropylene.

3. The system of claim 1, wherein the elastomer material is a thermoplastic elastomer material.

4. The system of claim 1, wherein the vessel is a unitary structure including a bottom portion, a sidewall portion and a peripheral rim portion, the sealing surface is defined by an interior surface portion of the sidewall portion of the vessel at or adjacent the open top region, and the peripheral rim portion includes a generally flat top edge portion and the latch engagement lip portion extends from the top edge portion on an exterior side of the sidewall portion.

5. The system of claim 1, wherein the vessel is fabricated of a glass suitable for baking or oven heating applications.

6. The system of claim 5, wherein the glass is borosilicate glass.

7. The system of claim 1, wherein the seal structure material is a material having good adhesion to the lid portion plastic material, and wherein the seal structure portion is fabricated as an injection molded second shot onto the lid portion.

8. The system of claim 7, wherein the latch or set of latches comprise a latch connected to the lid portion by a living hinge, said living hinge defined by said elastomer material fabricated by the injection molded second shot.

9. The system of claim 1, wherein the lid portion includes a web portion which is configured to extend over the open top region of the vessel when the lid is attached, a peripheral region extending about the periphery of the lid, a downwardly protruding outer peripheral sidewall portion and a downwardly protruding inner peripheral rib defining a lower ring portion, and wherein the seal structure portion comprises a circumferential seal portion extending from the lower ring portion about the entire periphery of the inner peripheral rib portion of the lid portion, the circumferential seal portion configured to engage the sealing surface portion of the peripheral edge of the vessel to create an air-tight seal.

10. The system of claim 9, wherein the one or more latches comprise a plurality of latches attached to the peripheral region of the lid portion adjacent the outer peripheral sidewall portion by respective living hinge portions.

11. The system of claim 1, wherein the seal structure portion comprises a circumferential seal portion extending about the entire periphery of an interior inner peripheral rib portion of the lid portion, the circumferential seal portion configured to engage the sealing surface portion of the peripheral edge of the vessel to create an air-tight seal.

12. The system of claim 11, wherein the seal structure portion defines a flexible peripheral flap which bends as the lid is placed in position on the vessel and the flexible flap comes into contact with the sealing surface portion of the vessel, and is bent upwardly as the lid is latched.

13. The system of claim 12, wherein the sealing surface is defined by a sidewall portion of the vessel at or adjacent the open top region.

14. The system of claim 13, wherein the sidewall portion is angled outwardly from a bottom region of the vessel.

15. A container and air-tight lid system, comprising:
 a glass, ceramic or metal vessel having an open top surrounded by a peripheral edge portion;

a lid including a lid portion fabricated of a plastic material, and a seal structure portion formed of an elastomeric material, the seal structure portion integrated with the lid portion to form a unitary lid-seal structure wherein the seal structure portion is permanently attached to the lid portion;

the lid configured to attach to the vessel open top by means of a latch or set of latches integrated with the lid portion, and the seal structure is configured to provide an air-tight seal between the lid portion and a sealing surface portion of the peripheral edge of the vessel when the lid is attached to the vessel;

wherein the vessel further includes a latch engagement lip portion configured for engagement with the latch or set of latches integrated with the lid;

wherein the lid portion includes a web portion which is configured to extend over the open top region of the vessel when the lid is attached, a peripheral region extending about the periphery of the lid, a downwardly protruding outer peripheral sidewall portion and a downwardly protruding inner peripheral rib defining a lower ring portion, and wherein the seal structure portion comprises a circumferential seal portion extending from the lower ring portion about the entire periphery of the inner peripheral rib portion of the lid portion, the circumferential seal portion configured to engage the sealing surface portion of the peripheral edge of the vessel to create an air-tight seal; and wherein a width dimension and elevation position of the circumferential seal portion vary spatially around a perimeter of the lid.

16. The system of claim 15, wherein the vessel is rectilinear with vessel corners, and the width dimension is wider in lid corners corresponding to the vessel corners to accommodate dimensional variations in the vessel.

17. The system of claim 15, wherein the vessel is rectilinear with vessel corners, and the elevation position of the circumferential seal portion is configured so that the circumferential seal portion is positioned lower in the vessel corners relative to the vessel open top than circumferential seal portions intermediate the vessel corners.

18. A container and air-tight lid system, comprising:

a glass, ceramic or metal vessel having an open top surrounded by a peripheral edge portion;

a lid including a lid portion fabricated of a plastic material, and a seal structure portion formed of an elastomeric material, the seal structure portion integrated with the lid portion to form a unitary lid-seal structure wherein the seal structure portion is permanently attached to the lid portion;

the lid configured to attach to the vessel open top by means of a latch or set of latches integrated with the lid portion, and the seal structure is configured to provide an air-tight seal between the lid portion and a sealing surface portion of the peripheral edge of the vessel when the lid is attached to the vessel;

wherein the vessel further includes a latch engagement lip portion configured for engagement with the latch or set of latches integrated with the lid;

wherein the lid portion includes a web portion which is configured to extend over the open top region of the vessel when the lid is attached, a peripheral region extending about the periphery of the lid, a downwardly protruding outer peripheral sidewall portion and a downwardly protruding inner peripheral rib defining a lower ring portion, and wherein the seal structure portion comprises a circumferential seal portion extending from the lower ring portion about the entire periphery of the inner peripheral rib portion of the lid portion, the circumferential seal portion configured to engage the sealing surface portion of the peripheral edge of the vessel to create an air-tight seal; and wherein the lid portion has flow channels extending through the peripheral region between a lid top surface and a surface of the inner peripheral rib, and the seal structure portion comprises a top peripheral layer portion covering at least a portion of the peripheral region of the lid portion, a rib layer formed on a portion of the inner peripheral rib, and a ring portion extending over a bottom edge of the lower ring portion to form the circumferential seal portion which extends outwardly from the lower ring portion.

19. A container and air-tight lid system, comprising:

a glass, ceramic or metal vessel having an open top surrounded by a peripheral edge portion;

a lid including a lid portion fabricated of a plastic material, and a seal structure portion formed of an elastomeric material, the seal structure portion integrated with the lid portion to form a unitary lid-seal structure wherein the seal structure portion is permanently attached to the lid portion;

the lid configured to attach to the vessel open top by means of a latch or set of latches integrated with the lid portion, and the seal structure is configured to provide an air-tight seal between the lid portion and a sealing surface portion of the peripheral edge of the vessel when the lid is attached to the vessel;

wherein the vessel further includes a latch engagement lip portion configured for engagement with the latch or set of latches integrated with the lid;

wherein the lid portion includes a web portion which is configured to extend over the open top region of the vessel when the lid is attached, a peripheral region extending about the periphery of the lid, a downwardly protruding outer peripheral sidewall portion and a downwardly protruding inner peripheral rib defining a lower ring portion, and wherein the seal structure portion comprises a circumferential seal portion extending from the lower ring portion about the entire periphery of the inner peripheral rib portion of the lid portion, the circumferential seal portion configured to engage the sealing surface portion of the peripheral edge of the vessel to create an air-tight seal; and wherein the lid portion further includes a plurality of transverse rib portions extending between the inner peripheral rib portion and the outer peripheral sidewall portion, said elastomer material having a layer of said elastomer material formed thereon, said layer being compressed between said transverse rib portions and said vessel sealing surface portion of said vessel.

20. A container and air-tight lid system, comprising:

a glass, ceramic or metal vessel having an open top surrounded by a peripheral edge portion;

a lid including a lid portion fabricated of a plastic material, and a seal structure portion formed of an elastomeric material, the seal structure portion integrated with the lid portion to form a unitary lid-seal structure wherein the seal structure portion is permanently attached to the lid portion;

the lid configured to attach to the vessel open top by means of a latch or set of latches integrated with the lid portion, and the seal structure is configured to provide an air-tight seal between the lid portion and a sealing surface portion of the peripheral edge of the vessel when the lid is attached to the vessel;

wherein the vessel further includes a latch engagement lip portion configured for engagement with the latch or set of latches integrated with the lid;

wherein the lid portion includes a web portion which is configured to extend over the open top region of the vessel when the lid is attached, a peripheral region extending about the periphery of the lid, a downwardly protruding outer peripheral sidewall portion and a downwardly protruding inner peripheral rib defining a lower ring portion, and wherein the seal structure portion comprises a circumferential seal portion extending from the lower ring portion about the entire periphery of the inner peripheral rib portion of the lid portion, the circumferential seal portion configured to engage the sealing surface portion of the peripheral edge of the vessel to create an air-tight seal; and wherein the seal structure portion comprises an outer rib layer portion formed on an outer surface portion of the inner peripheral rib, and a ring portion extending over a bottom edge of the lower ring portion to form the circumferential seal portion which extends outwardly from the lower ring portion.

21. The system of claim 20, in which the seal structure portion does not extend over a top surface of the lid portion, and includes an inner rib layer portion on a portion of an inner surface portion of the inner peripheral rib.

22. A lid for attachment to a vessel having an open top surrounded by a peripheral edge portion, the lid comprising:
a lid portion fabricated of a plastic material, and a seal structure portion formed of an elastomeric material different from said plastic material of the lid portion, the seal structure portion integrated with the lid portion to form a unitary lid-seal structure wherein the seal structure portion is permanently attached to the lid portion;
a set of latches integrated with the lid portion; and
wherein the seal structure is configured to provide an air-tight seal between the lid portion and a sealing surface portion of the peripheral edge of the vessel when the lid is attached to the vessel; and
wherein the lid portion has flow channels extending through the peripheral region between a lid top surface and a surface of the inner peripheral rib, and the seal structure portion comprises a top peripheral layer portion covering at least a portion of the peripheral region of the lid portion, a rib layer formed on a portion of the inner peripheral rib, and a ring portion extending over a bottom edge of the lower ring portion to form the circumferential seal portion which extends outwardly from the lower ring portion.

23. The lid of claim 22, wherein the plastic material is polypropylene, and the elastomer material is a thermoplastic elastomer material.

24. The lid of claim 22, wherein the seal structure material is a material having good adhesion to the lid portion plastic material, and wherein the seal structure portion is fabricated as an injection molded second shot onto the lid portion.

25. The lid of claim 22, wherein the seal structure portion comprises a circumferential seal portion extending about the entire periphery of an interior inner peripheral rib portion of the lid portion, the circumferential seal portion configured to engage the sealing surface portion of the peripheral edge of the vessel to create an air-tight seal.

26. The lid of claim 25, wherein the seal structure portion defines a flexible peripheral flap which bends as the lid is placed in position on the vessel and the flexible flap comes into contact with the sealing surface portion of the vessel, and is bent upwardly as the lid is latched.

27. The lid of claim 22, wherein the lid portion includes a web portion which is configured to extend over the open top region of the vessel when the lid is attached, a peripheral region extending about the periphery of the lid, a downwardly protruding outer peripheral sidewall portion and a downwardly protruding inner peripheral rib defining a lower ring portion, and wherein the seal structure portion comprises a circumferential seal portion extending from the lower ring portion about the entire periphery of the inner peripheral rib portion of the lid portion, the circumferential seal portion configured to engage the sealing surface portion of the peripheral edge of the vessel to create an air-tight seal.

28. The lid of claim 27, wherein the set of latches are attached to the peripheral region of the lid portion adjacent the outer peripheral sidewall portion by respective living hinge portions.

29. A lid for attachment to a vessel having an open top surrounded by a peripheral edge portion, the lid comprising:
a lid portion fabricated of a plastic material, and a seal structure portion formed of an elastomeric material different from said plastic material of the lid portion, the seal structure portion integrated with the lid portion to form a unitary lid-seal structure wherein the seal structure portion is permanently attached to the lid portion;
a set of latches integrated with the lid portion; and
wherein the seal structure is configured to provide an air-tight seal between the lid portion and a sealing surface portion of the peripheral edge of the vessel when the lid is attached to the vessel;
wherein the lid portion includes a web portion which is configured to extend over the open top region of the vessel when the lid is attached, a peripheral region extending about the periphery of the lid, a downwardly protruding outer peripheral sidewall portion and a downwardly protruding inner peripheral rib defining a lower ring portion, and wherein the seal structure portion comprises a circumferential seal portion extending from the lower ring portion about the entire periphery of the inner peripheral rib portion of the lid portion, the circumferential seal portion configured to engage the sealing surface portion of the peripheral edge of the vessel to create an air-tight seal; and
wherein the lid portion further includes a plurality of transverse rib portions extending between the inner peripheral rib portion and the outer peripheral sidewall portion.

30. A lid for attachment to a vessel having an open top surrounded by a peripheral edge portion, the lid comprising:
a lid portion fabricated of a plastic material, and a seal structure portion formed of an elastomeric material different from said plastic material of the lid portion, the seal structure portion integrated with the lid portion to form a unitary lid-seal structure wherein the seal structure portion is permanently attached to the lid portion;
a set of latches integrated with the lid portion; and
wherein the seal structure is configured to provide an air-tight seal between the lid portion and a sealing surface portion of the peripheral edge of the vessel when the lid is attached to the vessel;
wherein the lid portion includes a web portion which is configured to extend over the open top region of the vessel when the lid is attached, a peripheral region extending about the periphery of the lid, a downwardly protruding outer peripheral sidewall portion and a downwardly protruding inner peripheral rib defining a lower ring portion, and wherein the seal structure portion comprises a circumferential seal portion extending from the lower ring portion about the entire periphery of the inner peripheral rib portion of the lid portion, the circumferential seal portion configured to engage the sealing surface portion of the peripheral edge of the vessel to create an air-tight seal; and wherein the seal structure portion comprises an outer rib layer portion formed on an outer surface portion of the inner peripheral rib, and a ring portion extending over a bottom edge of the lower ring portion to form the circumferential seal portion which extends outwardly from the lower ring portion.

31. A lid for attachment to a vessel having an open top surrounded by a peripheral edge portion, the lid comprising:

a lid portion fabricated of a plastic material, and a seal structure portion formed of an elastomeric material different from said plastic material of the lid portion, the seal structure portion integrated with the lid portion to form a unitary lid-seal structure wherein the seal structure portion is permanently attached to the lid portion;

a set of latches integrated with the lid portion; and wherein the seal structure is configured to provide an air-tight seal between the lid portion and a sealing surface portion of the peripheral edge of the vessel when the lid is attached to the vessel;

wherein the lid portion includes a web portion which is configured to extend over the open top region of the vessel when the lid is attached, a peripheral region extending about the periphery of the lid, a downwardly protruding outer peripheral sidewall portion and a downwardly protruding inner peripheral rib defining a lower ring portion, and wherein the seal structure portion comprises a circumferential seal portion extending from the lower ring portion about the entire periphery of the inner peripheral rib portion of the lid portion, the circumferential seal portion configured to engage the sealing surface portion of the peripheral edge of the vessel to create an air-tight seal; and in which the seal structure portion does not extend over a top surface of the lid portion, and includes an inner rib layer portion on a portion of an inner surface portion of the inner peripheral rib.

\* \* \* \* \*